United States Patent
Petit et al.

(10) Patent No.: US 12,261,872 B2
(45) Date of Patent: Mar. 25, 2025

(54) ENHANCED MACHINE LEARNING REFINEMENT AND ALERT GENERATION SYSTEM

(71) Applicant: Palantir Technologies Inc., Denver, CO (US)

(72) Inventors: Corentin Petit, Paris (FR); Jacob Albertson, London (GB); Marissa Kimball, London (GB); Paul Baseotto, Poole (GB); Pierre Cholet, Berlin (DE); Timur Iskhakov, London (GB); Victoria Galano, Paris (FR)

(73) Assignee: Palantir Technologies Inc., Denver, CO (US)

( * ) Notice: Subject to any disclaimer, the term of this patent is extended or adjusted under 35 U.S.C. 154(b) by 849 days.

(21) Appl. No.: 17/445,172

(22) Filed: Aug. 16, 2021

(65) Prior Publication Data

US 2022/0201030 A1 Jun. 23, 2022

Related U.S. Application Data

(60) Provisional application No. 63/199,280, filed on Dec. 17, 2020.

(51) Int. Cl.
| | |
|---|---|
| H04L 9/40 | (2022.01) |
| G06F 9/451 | (2018.01) |
| G06N 20/00 | (2019.01) |

(52) U.S. Cl.
CPC .......... *H04L 63/1433* (2013.01); *G06F 9/451* (2018.02); *G06N 20/00* (2019.01); *H04L 63/1425* (2013.01)

(58) Field of Classification Search
CPC . H04L 63/1433; H04L 63/1425; H04L 41/22; H04L 41/16; H04L 63/20; G06F 9/451; G06N 20/00
See application file for complete search history.

(56) References Cited

U.S. PATENT DOCUMENTS

| | | |
|---|---|---|
| 9,836,496 B1 | 12/2017 | Liu et al. |
| 11,348,448 B1 | 5/2022 | Adams et al. |

(Continued)

FOREIGN PATENT DOCUMENTS

EP 4030684 7/2022

OTHER PUBLICATIONS

U.S. Appl. No. 18/404,707, Enhanced Alert Generation System Based on Real-Time Manipulation of Datasets, filed Jan. 4, 2024.

(Continued)

*Primary Examiner* — Joseph P Hirl
*Assistant Examiner* — Thomas A Gyorfi
(74) *Attorney, Agent, or Firm* — Knobbe, Marten, Olson & Bear, LLP

(57) ABSTRACT

Systems and methods are provided for enhanced machine learning refinement and alert generation. An example method includes accessing datasets storing customer information reflecting transactions of customers. Individual risk scores are generated for the customers based on the customer information. Generating the risk score includes providing identified occurrences of scenario definitions and customer information as input to one or more machine learning models, the scenario definitions identifying occurrences of specific information reflected in the datasets, with the machine learning models assign respective risk scores to the customers. An interactive user interface is presented. The interactive user presents summary information associated with the risk scores, with the interactive user interfaces enabling an investigation into whether a particular customer is exhibiting risky behavior, responds to user input indicating feedback usable to update the one or more machine learning models or scenario definitions, with the feedback triggering updating of the machine learning models.

20 Claims, 16 Drawing Sheets

(56) References Cited

U.S. PATENT DOCUMENTS

| | | | |
|---|---|---|---|
| 11,626,009 B2 | 4/2023 | Adams et al. | |
| 11,900,792 B2 | 2/2024 | Adams et al. | |
| 2003/0065613 A1 | 4/2003 | Smith | |
| 2003/0195868 A1 | 10/2003 | Wilson et al. | |
| 2004/0177053 A1 | 9/2004 | Donoho et al. | |
| 2004/0260702 A1 | 12/2004 | Cragun et al. | |
| 2013/0085765 A1 | 4/2013 | Tuchinda et al. | |
| 2016/0182556 A1 | 6/2016 | Tatourian et al. | |
| 2016/0203575 A1* | 7/2016 | Madhu | H04W 12/12 705/319 |
| 2018/0173742 A1 | 6/2018 | Liu et al. | |
| 2019/0069851 A1 | 3/2019 | Sharma et al. | |
| 2019/0311367 A1* | 10/2019 | Reddy | G06Q 20/4016 |
| 2019/0356679 A1 | 11/2019 | Sites et al. | |
| 2019/0378050 A1* | 12/2019 | Edkin | G06N 20/20 |
| 2020/0089848 A1* | 3/2020 | Abdelaziz | H04L 63/1441 |
| 2022/0172211 A1* | 6/2022 | Muthuswamy | G06F 16/9024 |

OTHER PUBLICATIONS

U.S. Appl. No. 16/177,114, Enhanced Alert Generation System Based on Real-Time Manipulation of Datasets, filed Oct. 31, 2018.
U.S. Appl. No. 17/804,164, Enhanced Alert Generation System Based on Real-Time Manipulation of Datasets, filed May 26, 2022.
Official Communication for EP Patent Application No. 21215328.2 dated Jun. 15, 2022, 7 pages.
Official Communication for EP Patent Application No. 21215328.2 dated May 13, 2024, 4 pages.

* cited by examiner

FIG. 5B

Relevant hit

Scenario hit _632_

☒ S01: Cash withdrawal above a threshold [Edited] ×

Is hit Relevant: _634_

False [Edited] ◆

○ ⚞Submit⚟

Is useful scenario hit

Useful Scenario hit(s) * 652

- [x] 507:Sum of incoming wire transfers from High Risk countries ✕
- [x] 504:Sum of cash deposits in the last closed month ✕

Select all (30)

- [x] 501: Cash withdrawal above a threshold
- [x] 501: Cash withdrawal above a threshold
- [x] 501: Cash withdrawal above a threshold
- [x] 501: Cash withdrawal above a threshold

United States
Picrne Cheler

Germany
Piece Choler

Germany
Li Meyer-Amdit

France
Claire Choial

Manage addresses....

Risk Score

Unusual Tran Pattern Score

Percent International

ENHANCED MACHINE LEARNING REFINEMENT AND ALERT GENERATION SYSTEM

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

TECHNICAL FIELD

The present disclosure relates to systems and techniques for data integration, analysis, and visualization. More specifically, the present disclosure relates to machine learning techniques for alert generation.

BACKGROUND

With the continual increase in the volume of data being generated, identifying specific features or occurrences within the data may present great technological hurdles. Examples of data may include network logs, computer system logs, and so on. These logs may be generated in response to users utilizing a networked computing environment associated with an entity. Due to the size, and frequency of generation, of the logs, in general the entity may discard the logs or adjust them to reduce their size (e.g., remove subsets of the data). However, the above-described data may include network security information of technical or investigatory importance. For example, included in the logs may be evidence of improper access to the networked computing environment. Since the entity may have hundreds of thousands, or millions, of users, it may be impractical to analyze the logs to determine the improper accesses.

SUMMARY

Particular embodiments of the subject matter described in this specification can be implemented so as to realize one or more of the following advantages. A system described herein can rapidly analyze large datasets and generate alerts for consumption based on the analyses. These alerts, as will be described, may require time-sensitive actions or investigations to be performed. For example, an alert may indicate that a particular computing system may be compromised by an attacker. As another example, an alert may indicate detection of a potential technical problem associated with a machine on an assembly line. It may be appreciated that such alerts may require rapid investigatory review by end-users. Thus, being able to reliably generate such alerts, while also providing succinct interfaces to investigate the alerts, may provide substantial technical benefit to end-users.

As will be described, the alerts may be generated by the system using a data pipeline which combines a deterministic approach and a probabilistic approach. For example, deterministic rules (e.g., hard-coded rules) may be monitored and provided as input to a machine learning model. The rules may allow for encoding of complex scenarios in which end-users are interested. As an example, a deterministic rule may encode a scenario in which a user account escalates its privileges on a particular system (e.g., a domain controller). Since this scenario may be indicative of an attack on a network, the system may monitor for its occurrence. However, this occurrence may not always indicate that an attack is occurring. Thus, solely relying upon such inflexible rules may result in large numbers of alerts being generated. Since each of these alerts may need to be investigated by an end-user, it may reduce an ability of the end-user to properly identify and handle attacks.

Therefore, a machine learning model may be used to determine an overall score or likelihood. For example, the machine learning model may apply learned weightings to the rules. As another example, the machine learning model may use the rules as input along with extraneous information. Example extraneous information may include, with respect to a network, log information, user account information, and so on. Based on these input features, the system may determine whether to generate an alert.

To aid in investigating alerts, the system can advantageously present efficient user interfaces which summarize the alerts. For example, a user interface may order alerts according to the respective scores or likelihoods described above. The user interface may additionally allow for automated textual explanations regarding the alert. As an example, the textual explanations may indicate reasons which caused generation of the alert. These reasons may be based on application of the machine learning model.

In investigating an alert, an end-user may ascertain that the alert can be closed. For example, the alert may represent a false positive which is not indicative of an attack on a network. As another example, the alert may represent a true positive which is indicative of an attack. Advantageously, the end-user may provide feedback which is usable to enhance the alert generation process. For example, the end-user may indicate that certain rules aided, or did not aid, identifying the occurrence of an attack. In this example, the end-user may identify that a rule associated with a user account being accessed from different internet protocol (IP) addresses did not indicate an attack was occurring. Thus, the end-user can utilize the user interfaces described herein to specify that the rule was not helpful. Furthermore, the end-user may indicate that the machine learning model's determined score or likelihood was not helpful in determining whether an attack has occurred.

The system may use the feedback information to update certain rules and/or update the machine learning model. For example, the feedback may allow an end-user to recalibrate one or more rules. As another example, the feedback may trigger re-training of the machine learning model to update weightings being applied to the rules. In this way, the feedback may continuously improve upon techniques to generate alerts.

With respect to recalibrating a rule, the system can advantageously present efficient user interfaces which enable users to experiment with definitions of the rules. For example, a user may specify a definition which causes specific features of datasets to be analyzed, aggregated, and so on. As will be described the system may, in real-time (e.g., substantially real-time), present summary information related to the specified definition. Example summary information may include an indication of a number of alerts which would have been generated based on the definition (e.g., within a threshold or user-selectable time period). The user may then adjust the definition, and the system may present comparisons between the initially defined definition and the adjusted definition. In this way, the user may efficiently experiment with definitions. Advantageously, the user may cause a particular definition to be put into production (e.g., via a single user input, such as a 'one-click' implementation). For example, the system may monitor for future occurrences of the particular definition.

Thus, the techniques described herein address technological problems and improve the functioning of the computer. End-users may be assigned to investigate information which may be buried within large quantities of data. Such data may be far too extensive for any meaningful review without automated techniques. Alerts may therefore be triggered based on the occurrence of specific information or patterns within the data. However, prior automated techniques were inflexible such that too many alerts may be generated which reduces an effectiveness of the automated techniques. Additionally, hardcoded rules may lack nuance such that the automated techniques may fail to generate alerts when needed. In contrast, the techniques described herein leverage a data pipeline which combines deterministic and probabilistic techniques in a cohesive alert generation system. Furthermore, end-users may advantageously improve upon the alert generation techniques through providing of feedback information. Since the user interfaces utilized to provide such feedback are simple to utilize, end-users may rapidly enhance automated techniques to surface potentially time-sensitive information.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g., forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 5B is an example user interface including summary information associated with alerts.

FIG. 6C is an example user interface usable to provide feedback information reflecting the relevance of a scenario definition.

FIG. 6E is an example user interface usable to provide feedback information reflecting usefulness of one or more scenario definitions.

FIG. 7B is an example user interface for creating a scenario definition.

DETAILED DESCRIPTION

Introduction

Figure 1A:
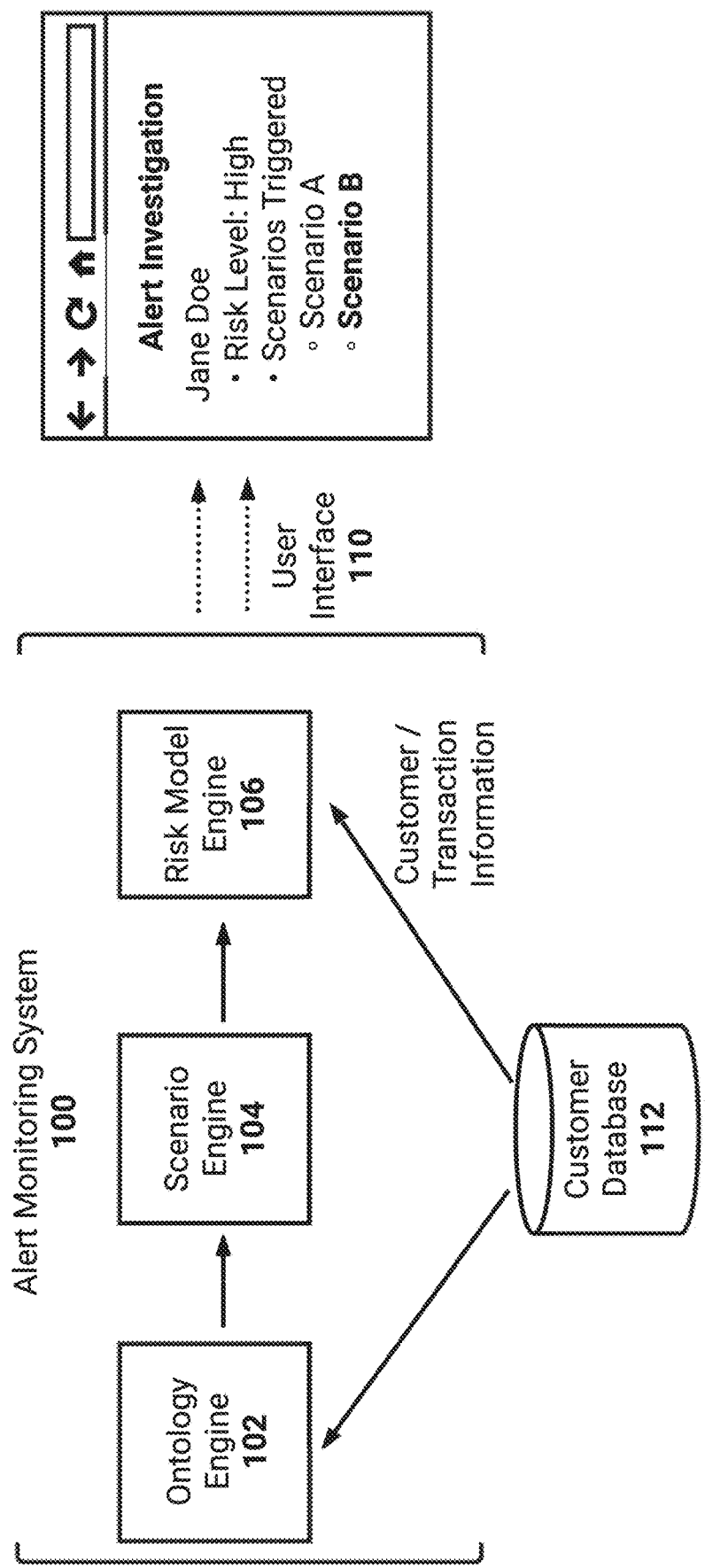
FIG. 1A illustrates an example alert monitoring system causing presentation of an interactive user interface.

This specification describes, among other things, the rapid interrogation and improvement of alerts automatically generated by a system based on deep analyses of datasets. The system may be the alert monitoring system 100 described in more detail below. It should be appreciated that data is continuously expanding both in scope and size. For example, an entity may now have greater access to data (e.g., an increasing number of systems, devices, and so on, may generate logs or records) and, also, the data itself may be increasing in size. Spread throughout datasets may be events, or combinations of features, to which the entity would prefer being alerted. However, given the quantity of data the entity may be unable to identify the events. Further complicating detection of these events is a lack of schemes to reduce the complexity in analyzing the data. With respect to the example of alerts, techniques to surface these events, or combinations of features, are inadequate for the modern data landscape.

As will be described, the system described herein can leverage a data pipeline to generate alerts which trigger investigations into different entities. Example entities may include employees, user accounts, systems, and so on. Entities, as described herein, are collectively referred to as customers (e.g., customers of a financial institution or network security company), however the techniques may be broadly applicable to other entities. As will be described, the system may allow for an investigation into whether a customer performed, or is otherwise associated with, a particular event of interest.

The data pipeline described herein combines deterministic rules with probabilistic techniques. Example deterministic rules, which are referred to herein as scenarios, may be specified by end-users of the system. These scenarios may be indicative of a customer performing a particular event of interest. As will be described in FIG. 7B, the end-users may use a user interface to quickly specify scenario definitions for the scenarios. In this example, the scenario definitions may be used by the system to monitor for occurrences of a scenario definition in raw data. Example probabilistic techniques may include use of machine learning models.

The system may provide the output of the scenarios as input to a machine learning model (e.g., a random forest, a neural network). For example, the output of the deterministic rules may be specific to a particular customer. Thus, the machine learning model may receive an aggregate of the output of the deterministic rules for the customer as input to the model. The machine learning model may be trained to assign varying weights to the different deterministic rules. The system may therefore generate output from the machine learning model for the particular customer, with the output being usable to inform generation of an alert for investigation by an end-user. For example, the end-user may investigate the particular customer using example user interfaces to ascertain whether a particular event of interest has occurred. Investigating an alert will be described in more detail below, with respect to at least FIGS. 5A-5B.

Through investigating alerts, an end-user may identify whether the alert has properly led to confirmation of an event of interest (e.g., a true positive). In contrast the end-user may identify that the alert has led to confirmation that the event did not occur (e.g., a false positive). The system may advantageously respond to feedback from the end-user which is usable to enhance the data pipeline described above. For example, the end-user may identify that the occurrence of a particular scenario is not helpful in identifying a true positive. As will be described, the end-user may then customize the particular scenario to better identify an event of interest. Advantageously, the system may graphically present the effectiveness of different scenario definitions for the particular scenario.

As another example, the end-user may identify that the machine learning model is to be updated. For example, the end-user may cause the machine learning model to increase, or decrease, a weight associated with the above-described particular scenario. In this way, the machine learning model may be periodically re-trained to better align with surfacing complex events in large quantities of data.

The system may therefore continuously update the data pipeline described herein based on feedback from end-users performing investigations into alerts. Over time the alerts which are generated may be substantially more accurate than alerts generated by prior techniques. Additionally, the user interfaces described herein may allow for a seamless transition between (1) investigating an alert, (2) closing an alert and providing feedback information, and (3) updating of scenarios to more closely align with the accurate surfacing of events.

Introduction—Feedback-Based Data Pipeline

As will be appreciated, datasets may be stored in databases. The information included in the datasets may thus represent respective rows of database tables. Therefore, a first example scheme to define an alert may include using a query language to create a complex expression of joins, filtering steps, and so on, to extract information from the datasets. However, this first example scheme introduces great complexity into defining the alert. For example, datasets may be modified over time (e.g., different column names, different number of columns, different types or forms of information included in each row, and so on). Thus, in the first example scheme the query language may be inadequate to address these modifications without unwieldy oversight. These inadequacies may thus result in users being limited to maintaining a limited quantity of alerts.

Advantageously, and as will be described, a second example scheme to define generation of an alert may be based on a data pipeline (e.g., illustrated in FIG. 4, and described below). The second example scheme may include graphically enabling users to utilize a rich language based on object types defined by an ontology. For example, a user may use an interactive user interface to define one or more scenarios indicative of an event of interest. Based on interactions with the user interface, the user may thus leverage a series of previously-defined, or user-definable, expressions to create complex scenario definitions which utilize the object types. These object types may then be automatically extracted from datasets via data transformations. For example, specific datasets may include information indicative of networks actions of user accounts. Thus, the user accounts may represent an object type extracted from the specific datasets. In this way, a user may specify a scenario definition through direct reference to the user accounts and one or more logical and/or mathematical expressions.

An example user interface may include elements for defining the scenario definition (herein referred to as specifying a scenario definition). As described above, a scenario definition may indicate one or more expressions, object types, and so on. Example object types may include a user account, an entity, a unique identifier, and any arbitrary classifiable abstraction described in one or more datasets. An expression may define one or more mathematical or logical operations to be applied to data included in datasets. An expression may optionally be defined (e.g., by an end-user) using one or more programming languages and may specify particular datasets. Example expressions may include filtering data, determining a moving average of specific types of values, and so on.

As described above, the datasets may be stored as database tables in one or more databases or storage systems. Optionally, the system may generate an expression dataset for an expression. The expression dataset may be stored as a separate database table or included as one or more columns in a prior dataset. In this example, the system may generate values for the expression based on values included in the database tables which are implicated by the expression. These generated values may thus be included in the expression dataset. As an example, an expression dataset may include values identifying a moving average of specific values included in the database tables. A user may thus specify combinations of expressions, and the values included in the expression datasets may be utilized. In this way, a user may specify one or more expressions that causes emergent patterns to form from the datasets. A scenario definition may then be specified which is based, at least in part, on the pattern.

In this way, a user may quickly specify a scenario definition and cause occurrences of the scenario definition to be monitored. As utilized herein, an occurrence of a scenario definition may represent satisfaction of the object types and expressions specified in the scenario definition.

Occurrences of the scenario definition may be provided to a machine learning model to determine a measure of risk (referred to herein as a risk model). An example measure of risk may include a score or likelihood associated with risk of the occurrence of event. The example measure of risk may be specific to a particular customer, such as to a specific person, user account, system, and so on. For example, the machine learning model may utilize a particular activation function (e.g., a sigmoid) to assign a probability based on a forward pass through the model. In some embodiments, the system may trigger an alert based on the score exceeding a threshold. In some embodiments, an alert may be based on satisfaction of a logical expression. For example, the alert may be generated based on the occurrence of a particular scenario definition along with the score exceeding a threshold.

As an example, a company may maintain a networked computing environment for its employees to utilize. In this example, the company may use the techniques described herein to identify whether an employee's account has been compromised by an attacker. For example, a scenario definition may relate to escalation of privileges for an employee's account. As another example, a scenario definition may relate to whether an internet protocol (IP) address, which is used to access the account, is from an atypical geographic region. The system may monitor for occurrences of these scenario definitions for each employee account. Occurrences of these scenario definitions for each employee account may be provided to the risk model described herein. The occurrences, in combination with additional information, may be used to determine a risk score or likelihood that each employee account has been compromised. Example additional information may include log data identifying actions of each employee account within a threshold time period, features of the employee account (e.g., privileges, an employee role of the employee), and so on. Thus, the risk model may identify whether alerts are to be generated to trigger investigations into particular employees.

With respect to the above-described example, it may be appreciated that during the investigation an end-user may rely upon certain information to ascertain whether the employee's account was compromised. For example, the end-user may rely upon a first scenario definition related to escalation of privileges. In contrast, a second scenario definition related to geographic location of the IP address may not have been helpful to the end-user. As will be described below, with respect to at least FIGS. 6A-7C, the end-user may provide feedback regarding the scenario definitions. For example, the end-user may indicate that the second scenario definition is to be updated or is to be associated with a lower weighting in the risk model.

The feedback, which is referred to herein as feedback information, may be provided via example user interfaces described herein. Advantageously, end-users may cause continual refinement and updating of the data pipeline. For example, end-users may cause the risk model to be re-trained based on feedback reflecting the usefulness of certain scenario definitions. Additionally, the end-users may cause scenario definitions to be updated to better surface features indicative of an event of interest. For example, an end-user may indicate that a scenario definition is causing too many false positives. In this example, the end-user may utilize a user interface to generate different versions of the scenario definition. As will be described in FIG. 7C, the system may generate information usable to identify an effectiveness of each version of the scenario definition. For example, comparison information may be generated which indicates whether false positives, true positives, and so on, increase or decrease for the versions.

Introduction—Cohorts

The techniques described herein may be used for different cohorts, or groupings, of customers. With respect to the example above of employees, the system may access information identifying a cohort in which each employee is included. Thus, employees who are information technology (IT) professionals may be included in a first cohort. In contrast, employees who are managerial may be included in a second cohort. There may be a multitude of cohorts each with certain common features associated with the included customers.

Each of the cohorts may be associated with distinct, or adjusted, scenario definitions. As an example, a scenario definition may relate to transmitting a particular measure of data in a period of time. For managerial employees, this particular measure of data may reflect the managerial employee's reliance upon word documents, presentations, and so on. Thus, an occurrence of the scenario definition may indicate that the managerial employees are providing a measure of data which is greater than would be expected. This may encode a scenario in which the employees are improperly transmitting information to an outside entity. In contrast, for IT professionals this particular measure of data may be greater. For example, IT professionals may routinely transmit, or receive, large files or datasets. Thus, this scenario definition may be adjusted to reflect the realities of the different cohorts.

Additionally, each cohort may be associated with a distinct risk model which has been trained using training data specific to the cohort. For example, a risk model for a first cohort may have been trained using training data which leverages the scenario definitions for the first cohort. In this example, the training data may indicate occurrences of an event for which alerts are to be generated. The training data may indicate, for each occurrence of the event, occurrences of scenario definitions which are indicative of the event. The training data may also indicate additional information, such as information associated with the entities included in the first cohort. Example information may include log data, such as recent interactions of the customers (e.g., the above-described employees) with respect to a network environment (e.g., logging into systems, transferring data, and so on).

Example Alert Monitoring System

FIG. 1A illustrates an example alert monitoring system 100 causing presentation of an interactive user interface 110. The alert monitoring system 100 may represent a system of one or more computers, one or more virtual machines executing on a system of one or more computers, and so on. As described herein, the alert monitoring system 100 can analyze data associated with customers to trigger investigations into whether a particular event has occurred. An example of a particular event may include whether a user account of a customer has been compromised. Another example of a particular event may include whether a customer is engaged in improper financial transactions.

The example alert monitoring system 100 includes an ontology engine 102, a scenario engine 104, and a risk model engine 106. As will be described below, with respect to FIG. 4, these engines 102-106 may implement a data pipeline described herein. For example, the ontology engine 102 may allow for transformation of raw data into a form usable to encode particular scenarios. In this example, the ontology engine 102 may extract objects from the raw datasets. Example objects may include user accounts, financial accounts, sending or receiving entities, and so on. The ontology engine 102 allows for classification of information included in the raw datasets, such that specific events, or combinations of features, may be surfaced from the raw datasets.

With respect to the raw datasets, the ontology engine 102 may receive information from a customer database 112. The customer database 112 may reflect information recording disparate events, transactions, customer actions, and so on. As an example, the customer database 112 may record accesses to one or more networks by customers. In this example, the database 112 may record timestamps associated with the accesses, identifying information of user devices utilized to access the networks, user account information for the accesses, and so on. As another example, the customer database 112 may record transactions of customers. An example transaction may include financial transactions. Another example transaction may include blockchain transactions. The customer database 112 may additionally store 'know your customer' (KYC) information. Example KYC information may include information sufficient to prove identity, address, and so on, of the customers.

The scenario engine 104 may identify occurrences of particular scenario definitions. As described herein, a scenario definition may represent a definition specified by a user which indicates one or more of the object types and one or more expressions. For example, a scenario definition may be used to deterministically identify whether a particular scenario has occurred. In this example, the scenario engine 104 may access customer information for a particular customer and determine whether the scenario definition has occurred.

The scenario engine 104 may monitor for occurrences of a multitude of scenario definitions for each customer reflected in the customer database 112. For example, the scenario engine 104 may identify whether a particular customer has uploaded greater than a threshold measure of data to a third-party cloud storage. In this example, the scenario engine 104 may identify satisfaction of a logical expression which uses (1) an object type associated with a measure of data and (2) an object type associated with a receiving entity. The customer database 112 may record example transactions indicating bandwidth utilized by the particular customer or file sizes uploaded by the particular customer. The transactions may additionally indicate network addresses associated with a receiving entity. The scenario engine 104 may aggregate these transactions to determine a total measure of data provided to the third-party cloud storage.

Output of the scenario engine 104 may be provided to the risk model engine 106. The output may, in some embodiments, indicate the occurrence of one or more of the scenario definitions. Thus, the scenario engine 104 may indicate whether each scenario definition has been satisfied for a customer based on his/her data. The output may additionally indicate a particular value for a scenario definition. As an example, a scenario definition may cause generation of output within a range of values (e.g., 1, 3, 7, 9). For this example, the scenario definition may indicate a risk associated with a third-party site or system to which a customer is providing data. Similarly, the scenario definition may indicate a risk associated with a location in which a customer is located.

The risk model engine 106 may execute a risk model (e.g., a machine learning model, such as a random forest or neural network). As may be appreciated, the machine learning model may be trained using training data, validation data, and so on. For example, the alert monitoring system 100 may generate alerts to investigate occurrences of financial fraud. In this example, the risk model engine 106 may be trained to output, for a particular customer, a risk score or likelihood that the particular customer committed financial fraud. The machine learning model may utilize occurrences of scenario definitions for the particular customer along with customer information associated with the particular customer. For example, the customer information may be obtained from the customer database 112.

In this way, the risk model engine 106 may determine a risk score or likelihood for each of the customers. In some embodiments, the customers may be included in different cohorts. For example, a first subset of the customers may be included in a first cohort while a second subset of the customers may be included in a second subset. In this example, the first cohort may have different, or adjusted, scenario definitions as compared to the second cohort. Additionally, the first cohort may have a different machine learning model as compared to the second cohort. For example, the different machine learning models may be separately trained. As another example, the different machine learning models may be of differing types.

In some embodiments, the machine learning model may represent a mixture of experts model. For example, a neural network may be conditioned on features of customers or on specific cohorts. The mixture of experts model may include a multitude of sets of weights for use in the neural network, and the risk model engine 106 may blend the weights based on the features of a customer. Example features may include, a location of a customer, one or more measures of financial activity or network activity, and so on. In this way, the neural network may be tailored based on the specific features of multitudes of customers.

The alert monitoring system 100 may generate alerts for inclusion in a user interface 110 accessible to end-users via respective user devices. For example, an alert may be generated which indicates that a particular customer should be investigated via the user interface 110 (e.g., 'Jane Doe'). In this example, the alert may be generated based on a risk score or likelihood determined for the particular customer exceeding a threshold. The alert may also be generated based on the occurrence of specific (e.g., a subset of) the scenario definitions for the particular customer.

The user interface 110 may thus indicate information usable to investigate a particular customer. In the example of FIG. 1A, the user interface 110 identifies a risk level (e.g., 'High') for the particular customer along with specific occurrences of scenario definitions. For example, the user interface 110 indicates the occurrence of 'Scenario A' and 'Scenario B.' As will be described in more detail below, an end-user can review detailed information for the particular customer. For example, the alert monitoring system 100 may generate alerts to trigger investigations into customers whose network-accessible accounts may have been compromised by a malicious attacker. In this example, the end-user may review details regarding specific log-ins to a user account associated with the particular customer. Example details may include an indication of user devices (e.g., MAC addresses) used to access the user account, network addresses used to access the user account, and so on.

An end-user may use the user interface 110 to determine an outcome of the investigation. In this way, the investigation may be closed. For example, the end-user can indicate that the alert generated for the particular customer was a false positive. In this example, the end-user may therefore determine that the particular customer did not perform actions, or exhibit behavior, which is indicative of an event of interest. As another example, the end-user can indicate that the alert was correctly generated. Thus, the end-user may determine that the particular customer did perform actions, or exhibit behavior, which is indicative of the event of interest.

As will be described in at least FIG. 1B, the end-user can additionally provide feedback. For example, the end-user can provide feedback which is usable to update the scenario engine 104 and/or risk model 106.

The user interface 110 may be an example of an interactive user interface presented on a user device of an end-user. Example user devices may include a laptop, a tablet, a mobile device, a wearable device, and so on. Optionally, the user interface 110 may be a web page generated, at least in part, by a system (e.g., the alert monitoring system 100). The web page may be provided for presentation to the user device via a network (e.g., the internet, a wide or local area network, and so on). In some embodiments, the system may execute a web application. Thus, interactions with the user interface 110 may be routed to the system for processing. The system may then cause the user interface 110 to be updated in response. In some embodiments, the user interface 110 may be generated, at least in part, by an application executing on the user device. For example, the application may be an 'app' obtained from an electronic application store. In this example, the graphical elements included in the user interface 100 may be rendered by the application. Optionally, information may be obtained from the system and included in the user interface 110. For example, the specific details of the regarding the particular customer may be included.

Figure 1B:
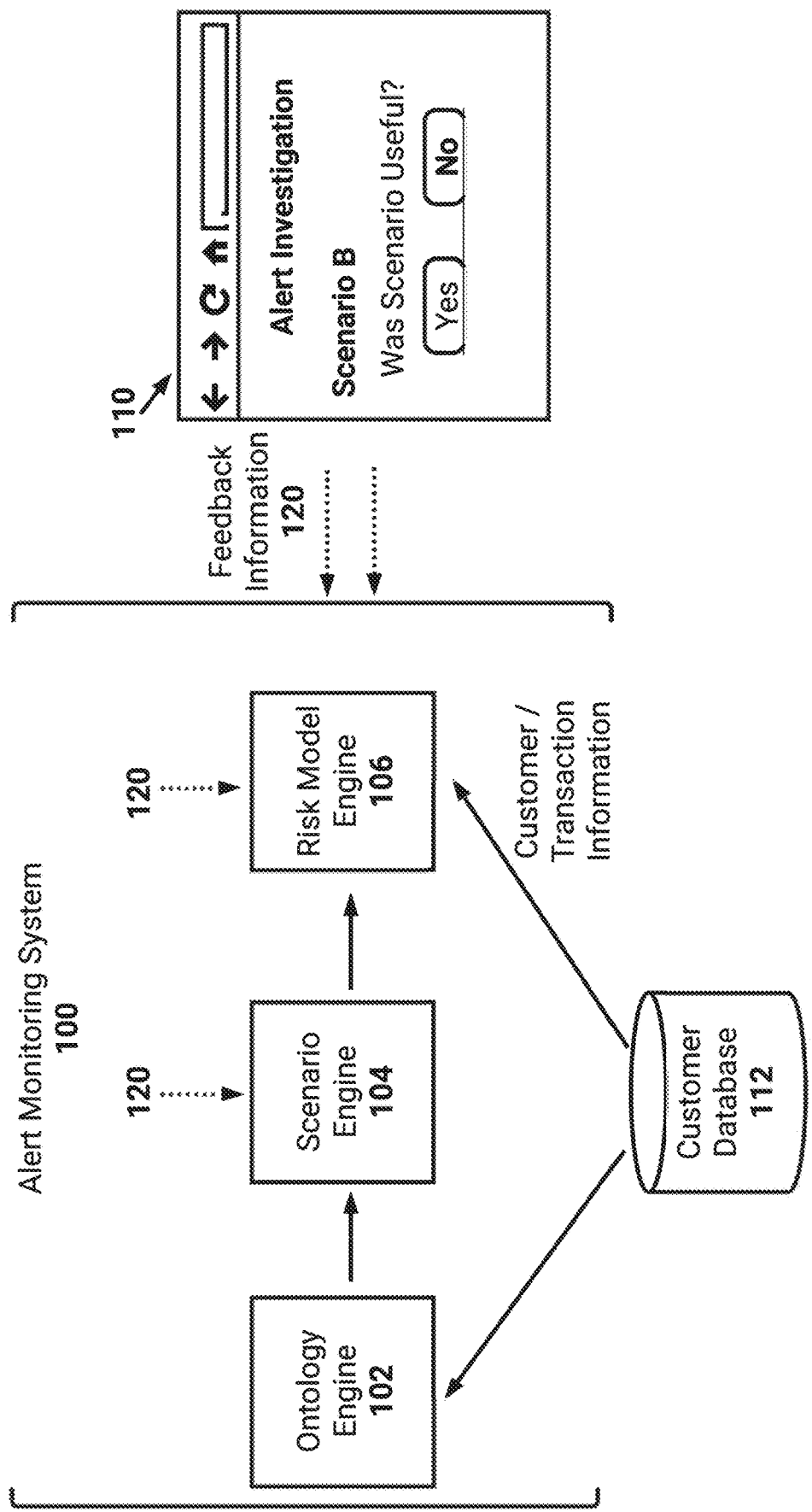
FIG. 1B illustrates the example alert monitoring system responding to feedback information provided via the interactive user interface.

FIG. 1B illustrates the example alert monitoring system 100 responding to feedback information 120 provided via the interactive user interface 110. In the illustrated example, the end-user of the user interface 110 has indicated that the occurrence of 'Scenario B' was not helpful to closing the end-user's investigation. For example, 'Scenario B' may be too generic to properly surface events of interest. As another example, 'Scenario B' may be too similar to another scenario definition such that it provides little extra benefit.

The feedback information 120 may be received by the alert monitoring system 100 and used to update the scenario engine 104 and/or risk model engine 106. For example, the alert monitoring system 100 may store information indicating that the scenario definition for 'Scenario B' is to be updated. As will be described in FIG. 7A, a user interface associated with creation of 'Scenario B' may present the feedback information 120. In this way, an end-user may adjust the scenario definition for 'Scenario B' such that it more accurately surfaces information usable to generate an alert.

Additionally, the feedback information 120 may trigger the risk model engine 106 to update the risk model. In the illustrated example, the end-user has indicated that 'Scenario B' was not useful in closing the investigation. This information may be used to reduce an extent to which an occurrence of 'Scenario B' impacts a resulting risk score or likelihood. For example, the risk model engine 106 may reduce a weight associated with 'Scenario B.' As another example, the risk model engine 106 may update a bias or weighting factor associated with 'Scenario B' which is usable to determine loss for a neural network. While not illustrated, it may be appreciated that the end-user may indicate that 'Scenario B' was useful in closing the investigation. Similar to the above, the risk model engine 106 may increase a weight associated with 'Scenario B' or otherwise recalibrate the weightings of the scenario definitions to relatively increase 'Scenario B.'

The feedback information 120 may also be used to update the risk model based on an outcome associated with the closing of the investigation. For example, the risk model engine 120 may determine a high risk score or likelihood for the particular customer. The end-user, in contrast, may identify that the high risk score or likelihood was a false positive. Using the user interface 110, the end-user may close the investigation and indicate that the particular customer is not associated with an event of interest.

The risk model engine 106 may aggregate training information based on customer-level responses from end-users. For example, the risk model engine 106 may include information reflecting the above-described particular customer and the negative outcome. In this example, the risk model engine 106 may periodically update the risk model based on this empirically determined data. Optionally, the risk model engine 106 may discard certain older training data. For example, a sliding window may be used such that training data from a threshold period of time is used to train the risk model. With respect to the feedback information 120, the sliding window may optionally replicate the feedback indicating the negative outcome or otherwise more heavily the feedback.

In this way, the alert monitoring system 100 may be responsive to feedback from end-users. The feedback, as described above, may allow for refinements and adjustments to the alert monitoring system 100. Example refinements and adjustments may allow for enhancing scenario definitions, the risk model, and so on.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, Text (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties.

Object Type: Type of a data object (e.g., Person, Event, Document, Transaction, User Account, Entity). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g., a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Scenario Definition: A definition specified by an end-user, or automatically by a system, that indicates one or more of the object types and one or more expressions. The definition may represent a deterministic encoding of a particular scenario (e.g., a rule). A system can utilize the scenario definition to determine occurrences of the scenario definition. For example, the system can access information specific to a user or customer and determine an occurrence of a scenario definition based on the accessed information. A determined occurrence may represent a binary indication (e.g., a yes or no). A determined occurrence may also represent a value (e.g., a real number), such as 1, 2, 10.3, and so on. The system can generate an alert based occurrences of one or more scenario definitions. The system can also generate an alert based on an output of a machine learning model which uses, at least in part, occurrences of one or more scenario definitions.

Expression: A mathematical or logical expression which utilizes data stored in one or more datasets. The expression may cause evaluation of the data according to the mathematical or logical statements. Optionally, the expression may cause generation of an expression dataset which includes values generated by the expression. Optionally, the expression may cause generation of one or more columns in a dataset which includes values generated by the expression.

Risk Score: A score determined by a machine learning model for an entity, such as a user or customer, which is usable to assign a measure of risk to the user or customer. The measure of risk may relate to a score or likelihood of a customer performing, or otherwise being associated with, an event of interest (e.g., risky behavior, financial fraud, and so on). A risk score may be based on input including occurrences of scenario definitions and other information which are specific to a customer. Example other information may include transaction information (e.g., transactions associated with a user or customer) and user or customer information (e.g., characteristics or features of the user or customer). The machine learning model may use supervised learning techniques and may represent a random forest, support vector machine, neural network, and so on. With respect to the neural network, a forward pass may be computed by a system with an output representing the score. In some embodiments, the neural network may use a mixture of experts model which is conditioned on features of users or customers. As an example, the features may be indicative of a specific cohort in which a particular user or customer is included.

Object-Centric Data Model

To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
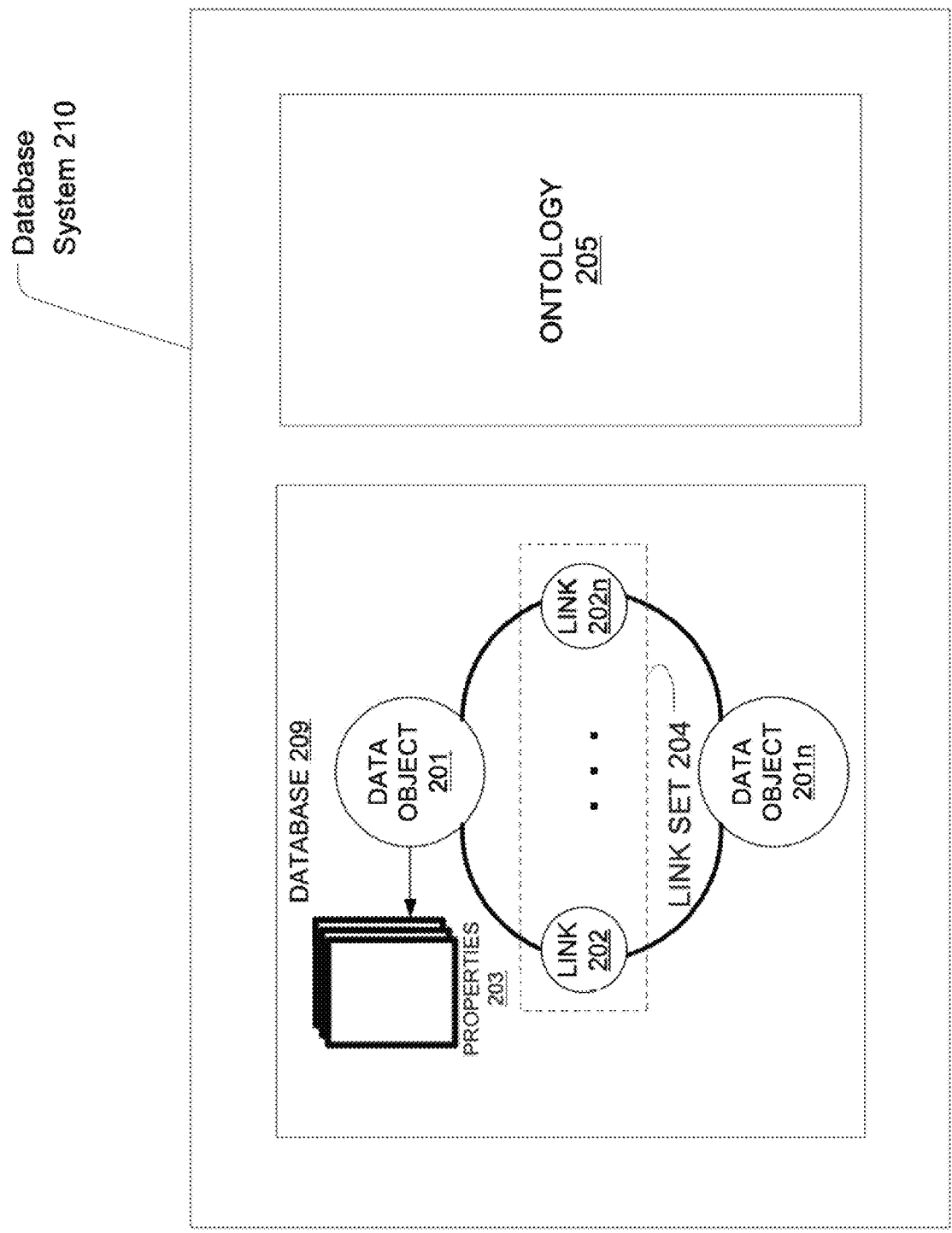
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27 2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
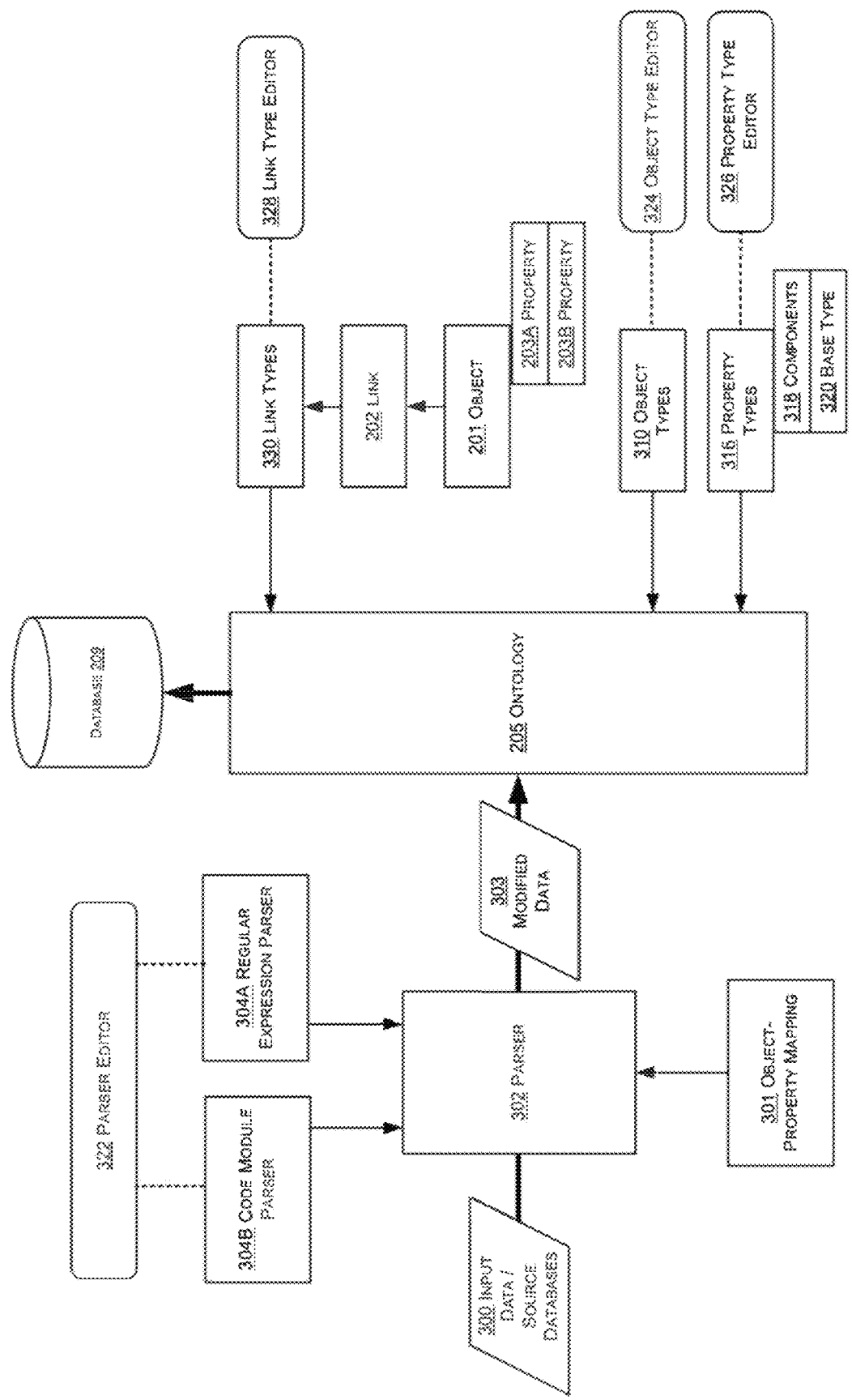
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Example Block Diagrams

Figure 4:
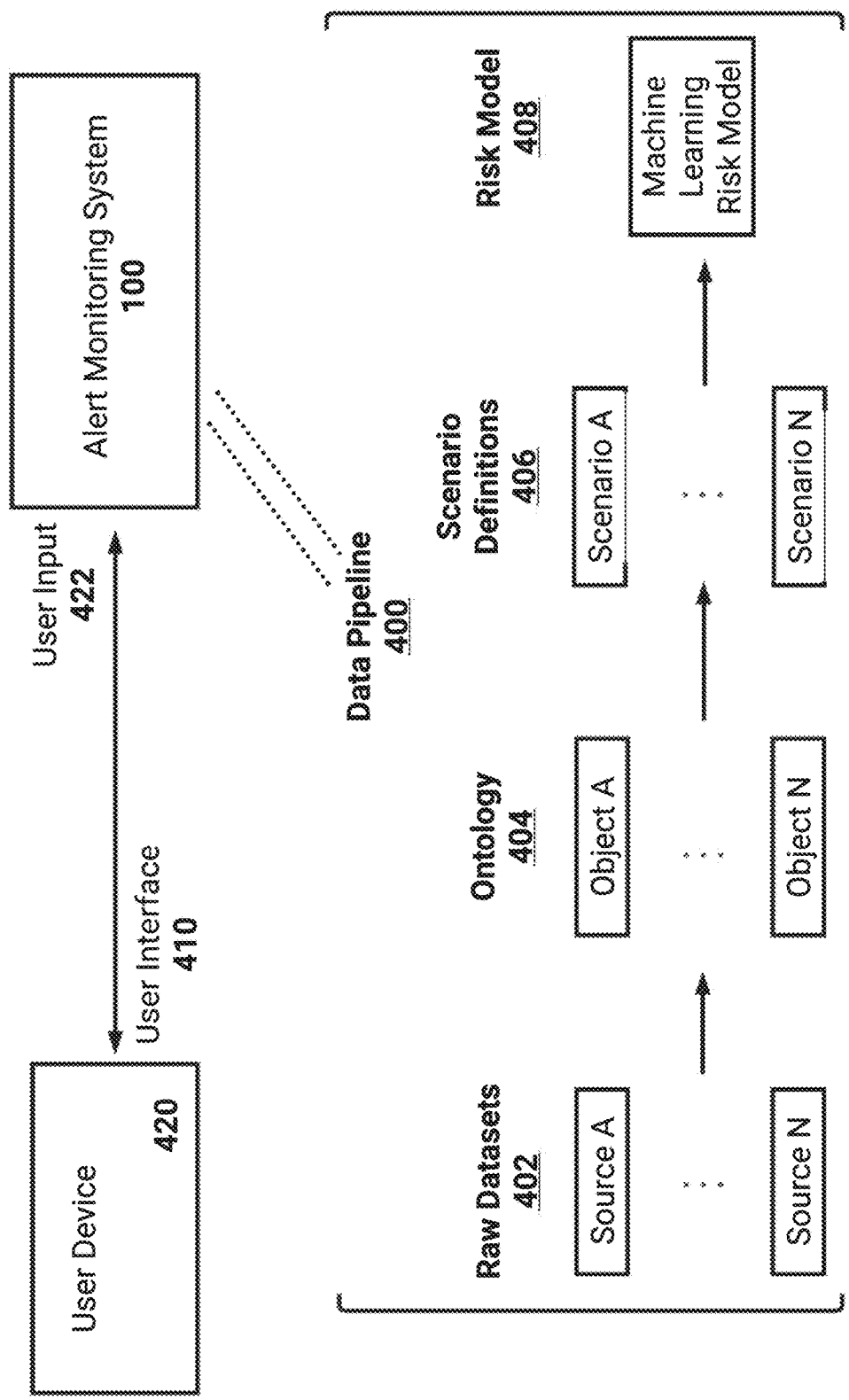
FIG. 4 illustrates a block diagram of an example alert monitoring system implementing a data pipeline according to the techniques described herein.

FIG. 4 illustrates a block diagram of an example alert monitoring system 100 implementing a data pipeline 400 according to the techniques described herein. As illustrated, the alert monitoring system 100 is causing presentation of a user interface 410 via a user device 420. As described above, the user device 420 may represent a laptop, tablet, mobile device, wearable device, and so on. The user device 420 is illustrated as providing user input 422 to the alert monitoring system 100, for example user input 422 directed to the user interface 410.

An example of the data pipeline 400 is included in FIG. 4. In some embodiments, a graphical representation of the data pipeline 400 may be included in user interface 410. For example, an end-user of the user device 420 may provide user input 422 to zoom in or zoom out of the user interface 410. As another example, the end-user may provide user input 422 to adjust one or more elements included in the data pipeline 400. As an example, the end-user may select a particular scenario definition (e.g., 'Scenario A'). For this example, the user interface 410 may update to enable adjustment of the particular scenario definition.

The data pipeline 400 indicates raw datasets 402 that may be obtained from a multitude of sources. For example, the raw datasets 402 include Source A-N which may include distinct information. For example, Source A may have been generated by a domain controller which responds to security authentication requests. As another example, Source N may have been generated by user devices and reflect user actions taken on the user devices. Thus, these sources may include information which is relevant to monitoring events of interest. In some embodiments, the raw datasets 402 may include transaction information. For example, a transaction may represent a financial transaction in which identifies sending information, receiving information, monetary information, and so on. As another example, a transaction may represent a network transaction. For example, the network transaction may be generated from log data and indicate network actions.

With respect to the ontology 404, Objects A-N may represent distinct object types extracted from the raw datasets 402. Example object types may include a user account, specific network actions taken by one or more user accounts, internet protocol (IP) addresses of user devices, locations from which a network was accessed, and so on. An example object type may further include an entity involved in a transaction. An example object type may further include a transaction. In this example, the transaction may be referenced in different sources of the raw datasets 402. Thus, information for each transaction may be aggregated from the raw datasets 402. In this way, all aggregated information for a transaction may be accessed.

With respect to scenario definitions 406, each scenario definition may specify object types (e.g., Objects A-N) and one or more expressions. Optionally a scenario definition may only specify an object type, or only specify an expression. Optionally, a scenario definition may specify expressions and particular columns or rows of particular database tables. As described herein, the alert monitoring system 100 may monitor for occurrences of each scenario definition.

The risk model 408, as described above, may represent a machine learning model which utilizes occurrences of the scenario definitions 406 as input to the machine learning model. The alert monitoring system 100 may determine risk scores for a multitude of customers. As an example with respect to a customer, the occurrences of the scenario definitions 406 may be specific to the customer and based on raw data associated with the customer. The risk model 408 may additionally leverage information specific to the customer. For example, and with respect to the system 100 monitoring for financial fraud, the risk model 408 may leverage financial characteristics of the customer. An output of the risk model 408 may represent a risk score or likelihood associated with the customer being associated with a particular event of interest (e.g., financial fraud).

In some embodiments, the alert monitoring system 100 may generate alerts for specific customers. For example, the alerts may be provided as notifications to the user device 420 and/or may be included in the user interface 410. In some embodiments, the alerts may be generated for a customer if the customer's risk score exceeds a threshold. Optionally, an alert may be generated based on a combination of the customer's risk score exceeding a threshold and occurrences of a subset of the scenario definitions.

The user interface 410 may include summary information associated with the alerts. For example, and as illustrated in FIG. 5B, the user interface 410 may identify a multitude of customers who are ranked according to risk score. In this example, the end-user may identify a particular customer to investigate based on the associated risk score. Advantageously, the user interface 410 may indicate reasons for which a customer is associated with a particular risk score. For example, the risk model may output sub-risk scores for specific input features. In this example, certain scenario definitions may be indicative of similar features. As an example, a sub-risk score may indicate unusual trading patterns. A subset of the scenario definitions may be indicative of unusual trading patterns, such that the sub-risk score may be determined.

As an example of a scenario definition, the scenario definition may specify a user account as an object type. The scenario definition may further specify whether a number of log-ins of a user account exceeds a threshold within a particular time period. The alert monitoring system 100 may thus monitor for occurrences of the scenario definition. For example, the alert monitoring system 100 may utilize the data pipeline 400 to cause aggregation of information associated with each user account. The alert monitoring system 100 may then determine the number of log-ins of each user account within recurring of the particular time periods. If the number of log-ins for a particular user account exceeds the threshold for one of the recurring particular time periods, an occurrence may be determined for a customer associated with the particular user account.

As described above, the alert monitoring system 100 may enable a user of user device 420 to specify a scenario definition. Additionally, the system 100 may determine comparisons between versions of a scenario definition. As will be described in more detail below, with respect to FIGS. 7A-7C, the alert monitoring system 100 can determine summary information associated with a particular scenario definition. The user may then cause adjustments to be made to the particular scenario definition, and the system 100 may determine summary information associated with the adjustments. Graphical representations of comparisons between the determined summary information may then be included in the user interface 410. Examples of graphical representations are illustrated in FIG. 7C. In this way, a user of user device 430 may rapidly determine which version of a scenario definition is to be stored in the data pipeline 400. Thus, if a particular alert is not causing all, or a threshold percentage of, suspicious events to be identified then the user may quickly adjust the particular alert.

The above-described comparisons may include an extent to which true positives or false positives have changed based on versions of a scenario definition. As an example, a first version of the scenario definition may identify customers who have transmitted greater than a threshold measure of data in a period of time. For this example, the alert monitoring system 100 may determine occurrences of the first version via the techniques described herein. These occurrences may correspond to different customers, such that the alert monitoring system 100 has identified customers who have transmitted greater than the threshold measure of data in the period of time. As may be appreciated, as end-users use the user interfaces described herein, they may close investigations into customers. For example, an end-user may indicate that an investigation into a customer led to a true positive. In this example, the alert monitoring system 100 may have generated an alert to trigger an investigation in the customer. Thus, the alert monitoring system 100 may have access to historical information regarding true positives and false positives for customers. The true positives may represent customers who were determined to have performed, or otherwise been associated with, an event of interest. The false positives may represent customers for whom alerts were generation, but who were not determined to have performed, or otherwise been associated with, the event of interest.

In this way, the alert monitoring system 100 may identify a number of true positives and false positives based on the historical information. For example, the customers for which occurrences of the above-described first version of the scenario definition may be analyzed in view of the historical information. In this example, the alert monitoring system 100 may determine whether each customer was a true positive or a false positive based on respective investigations. The comparisons can optionally be performed using a similar, or same, time frame as the investigations. For example, if an end-user reviewed one of the identified customers at a particular time, then the system 100 may use raw data from the raw datasets 402 at about the particular time to determine an occurrence of the first version of the scenario definition for that customer. As another example, when determining occurrences of the first version of the scenario definition, the alert monitoring system 100 may identify customers who have been investigated. The system 100 may then use raw data of each identified customer which is within a threshold time period of the respective investigation.

Thus, the system 100 may identify whether an occurrence of the first version, for a customer, would have led to the customer being a true positive or false positive. Similarly, the alert monitoring system 100 may determine a number of true positives and false positives for the second version of the scenario definition. As will be described below, with respect to FIG. 7C, graphical representations of comparisons between the first version and second version may be presented.

As described above, the alert monitoring system 100 may determine true positives and false positives when comparing versions of one of the scenario definitions 406 based on use of the ontology 404 and raw datasets 402 in the data pipeline 400. In some embodiments, the alert monitoring system 100 may utilize the risk model 408 when comparing versions of a scenario definition. For example, an adjustment to a scenario definition may cause different occurrences of the scenario definition 406 to be determined as compared to the unadjusted scenario definition. With respect to the adjusted scenario definition, the alert monitoring system 100 may therefore identify customers for which occurrences were determined. For these identified customers, the alert monitoring system 100 may then identify occurrences of other of the scenario definitions 406.

Subsequently, these occurrences may be provided as input to the risk model 408. The alert monitoring system 100 may then identify, based on the risk model, whether respective alerts would have been generated for these identified customers. For example, and as described above, the system 100 can determine whether risk scores determined for the identified customers exceed a threshold. The alert monitoring system 100 may then determine whether investigations, such as indicated in historical information, into the customers were associated with true positives or false positives. These true positives or false positives may then be graphically compared with the unadjusted version of the scenario definition. In this way, the alert monitoring system 100 may determine whether adjusting the scenario definition would lead to better performance (e.g., lower false positives and/or higher true positives). In some embodiments, the alert monitoring system 100 may cause the risk model to be re-trained based on the adjusted scenario definition. In this way, the risk model 408 may be updated based on the adjusted scenario definition such that an enhanced comparison is performed.

Similar to the above, in some embodiments the alert monitoring system 100 may allow for creation of different versions of the risk model 408. For example, a first version of the risk model 408 may represent a first type of machine learning model (e.g., decision tree) while a second version of the risk model 408 may represent a second type of machine learning model (e.g., fully-connected neural network). As another example, the first version of the risk model 408 may have different input (e.g., different scenario definitions, or use different additional customer information as described above) as compared to a second version of the risk model 408.

The different versions of the risk model 408 may then be compared. For example, an accuracy may be determined for the versions (e.g., mean squared error). As another example, numbers of true positives and false positives may be determined for the versions. These numbers may be graphically compared in a user interface as described herein. A user of the user interface may provide input indicating that a certain version is to be placed in production. Thus, the certain version may be used as the risk model 408 on live (e.g., newly received) data.

Flowcharts

Figure 5A:
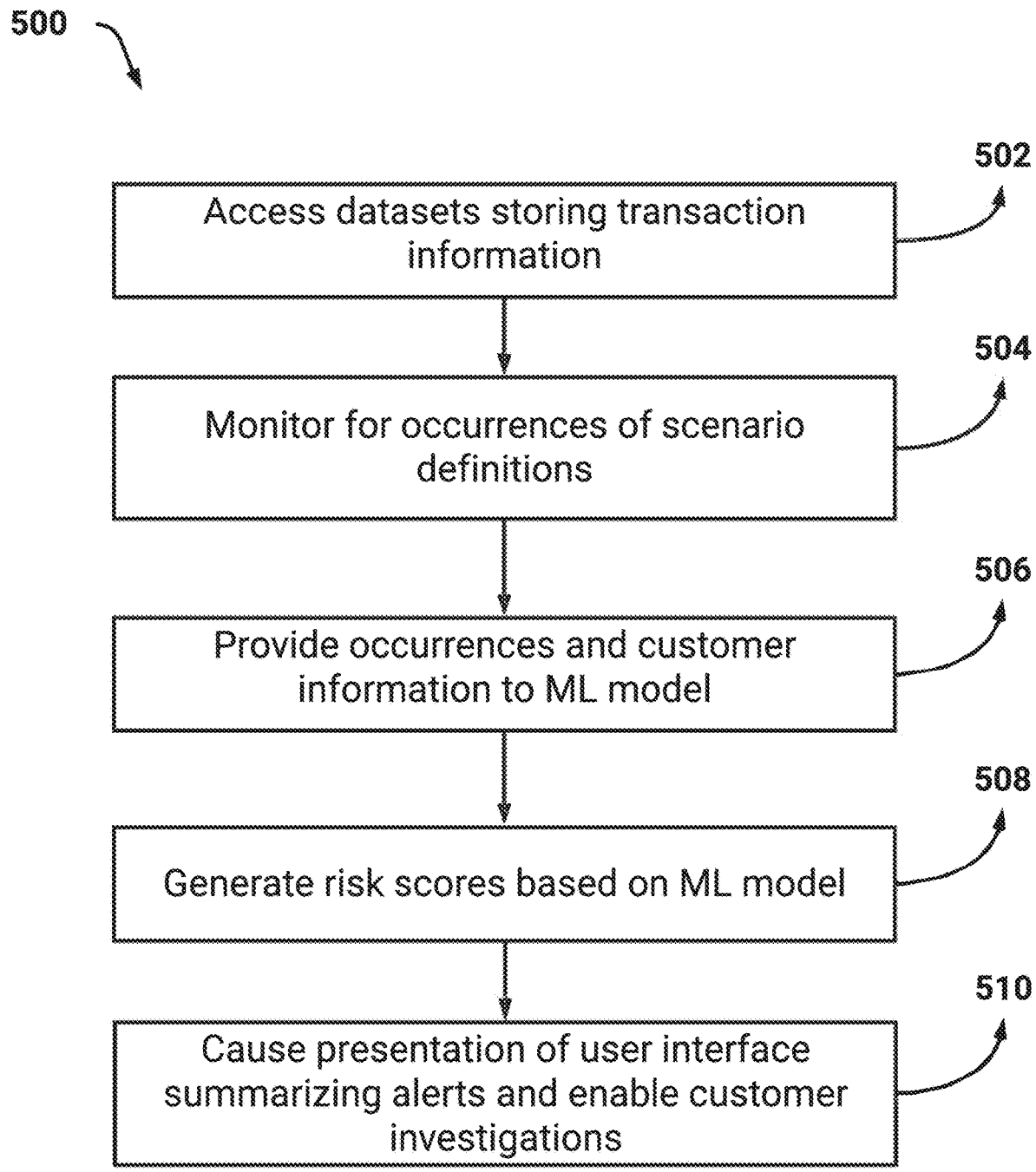
FIG. 5A illustrates a flowchart of an example process for presenting an interactive user interface summarizing alerts associated with customers.
Figure 5B:
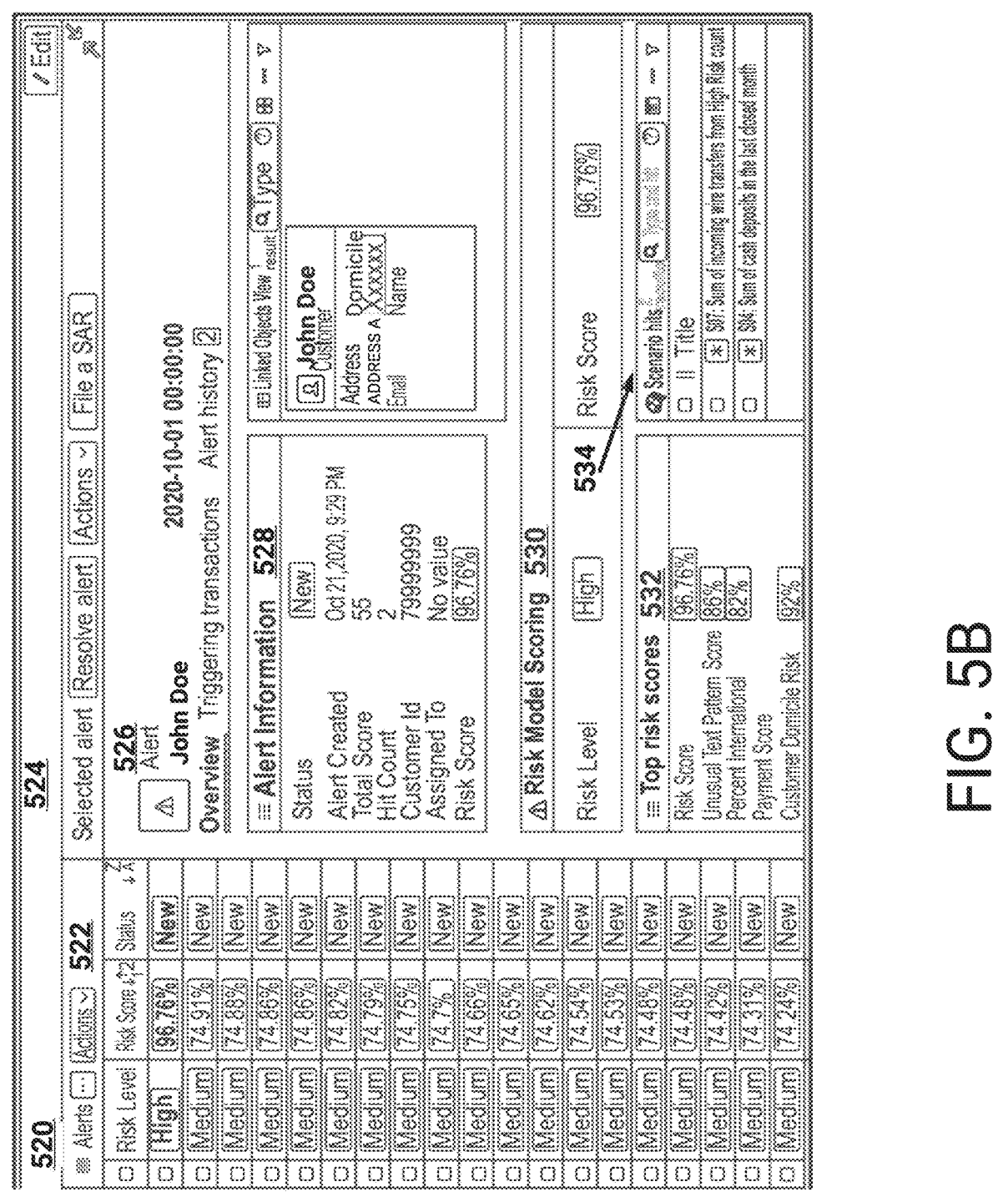

FIG. 5A illustrates a flowchart of an example process 500 for presenting an interactive user interface summarizing alerts associated with customers. For convenience, the process 500 will be described as being performed by a system of one or more computers (e.g., the alert monitoring system 100).

At block 502, the system accesses datasets. As described above, the system may utilize a data pipeline that indicates particular datasets to be utilized. These datasets may optionally reflect transaction information. For example, transaction information may indicate features associated with different transactions. Example features may include an indication of each entity or party included in a transaction, a timestamp associated with a transaction, an amount of money transferred in the transaction, financial institutions involved, locations implicated by the transaction, and so on.

At block 504, the system monitors for occurrences of scenario definitions. The system may store scenario definitions that indicate expressions to be applied to the datasets. These expressions, as described above, may be specified by a user utilizing one or more programming languages. Optionally, the user may utilize a user interface that graphically enables specification of an expression. For example, the user interface illustrated in FIG. 7C may be utilized.

As an example, a scenario definition may specify an expression associated with determining an average. The expression may utilize particular information included in the datasets (e.g., values included in a particular column of a database table), which may be addressable using an ontology. The expression may further indicate a time window associated with determining an average of the particular information. For example, the particular information may include a file size associated with a requested download. In this example, a customer may request downloads from a server, and the datasets may track a file size of each download. The expression may therefore cause an average download size to be determined. The average download size may be the average based on the indicated time window. Thus, the scenario definition may indicate that if the determined average is greater than a threshold, then an associated occurrence is to be generated.

In some embodiments, a scenario definition may include an expression which has information learned via a machine learning model. In the example above, a threshold is used in comparison to a determined average. An end-user who creates, or adjusts, this example scenario definition may optionally indicate that a value for the threshold is to be determined by the system. The system may learn this value based on training of a machine learning model, such as the risk model described herein. During training, the machine learning model may vary the value for the threshold. The training data may indicate investigations into customers, such that the model's error associated with the model's risk scores may be determined. In this way, the value for the threshold may be updated upwards, or downwards, to improve upon the model's errors.

At block 506, the system provides occurrences of the scenario definitions and customer information to a machine learning model (e.g., a risk model). Each of the occurrences, as described above, may be associated with a customer. For example, and with respect to the example of the average described above, a particular customer may be determined to have downloaded file sizes which are on average greater than a threshold. The system may therefore aggregate occurrences of scenario definitions for each, or a subset of, the customers. These aggregated occurrences may then be provided to the machine learning model along with associated customer information. In this way, the machine learning model may determine a risk score for each, or a subset of, the customers.

At block 508, the system generates risk scores based on the machine learning model. The risk score may indicate a risk or likelihood of a customer having performed, or otherwise been associated with, an event of interest (e.g., financial fraud, a victim of hacking, and so on). As described in block 506, the machine learning model may output a risk score for each, or a subset of, the customers. For example, and with respect to a neural network, the system computes a forward pass through the neural network. As another example, and with respect to a random forest, the system determines the risk score based on implementing the random forest.

In some embodiments, the system determines reasons for which a risk score was generated. For example, the system may determine a sub-risk score for a particular feature which is indicative of an event of interest. With respect to financial fraud, a sub-risk score may be indicative of unusual transaction patterns. With respect to a customer's account on a network being compromised, a sub-risk score may be indicative of unusual network actions by the account with respect to the network. The reasons may be presented in a user interface along with textual descriptions. For example, the textual descriptions may be defined by an end-user of the user interface to provide an understanding of the sub-scores.

The sub-risk score may optionally be determined by the machine learning model. For example, and with respect to a neural network, the sub-risk scores be output via a particular layer of the neural network. For example, a softmax function may be used to determine output probabilities. In some embodiments, this final layer may be connected to one or more additional layers which output the risk score. The sub-risk scores may optionally be based on specific input information, such as specific scenario definitions and/or specific customer information.

The sub-risk score may optionally be determined using occurrences of the scenario definitions. For example, the scenario definitions may be grouped into different sub-groups. Each sub-group may be indicative of one or more features associated with the event of interest. A sub-risk score may be determined for a customer based on a number of occurrences of scenario definitions in a particular sub-group. Optionally, certain scenario definitions may be weighted higher, or lower, than others in a sub-group. In some embodiments, these weightings may be learned by a machine learning model or may represent weightings used to determine the risk score described above.

At block 510, the system causes presentation of a user interface summarizing alerts and enables customer investigations. The system may generate alerts for inclusion in a user interface. For example, an alert may be generated for a customer based on the customer's determined risk score exceeding a threshold. As another example, an alert may be generated for a customer based on one or more sub-risk scores exceeding one or more thresholds. As another example, an alert may be generated for a customer based on an occurrence of a particular scenario definition optionally along with a risk score exceeding a threshold. For example, certain scenario definitions may automatically trigger an alert.

As described above, customers may be grouped into cohorts. For example, a first subset of the customers may be grouped into a first cohort while a second subset of the customers may be grouped into a second cohort. Thus, the scenario definitions may be specific to a certain cohort. Additionally, the machine learning model be specific to a certain cohort. In some embodiments, the user interface may present alerts for a specific cohort. An end-user of the user interface may select from among cohorts. For example, the end-user may indicate that he/she prefers to view alerts for managerial customers instead of information technology (IT) professionals. Thus, the end-user may prioritize certain cohorts over others. In some embodiments, the user interface may present alerts across cohorts. In this way, the end-user may view all alerts for any customer.

FIG. 5B is an example user interface 520 including summary information associated with alerts 522. The user interface 520 may presented via a user device of an end-user, such as described above with respect to at least FIG. 4. As described in FIG. 5A, alerts may be generated to trigger investigations into certain customers.

In the illustrated example, alerts 522 are included. The alerts indicate a risk level, such as low, medium, high. The risk level may be based on a risk score, such that each risk level may encompass a range of risk scores. The alerts 522 further indicate a risk score and a status. While not illustrated, the alerts 522 may further indicate a name or identifier associated with a customer. The risk score may be generated by a machine learning model, such as the risk model described herein. The status may indicate whether a customer has yet to be investigated (e.g., 'New'). The status may also indicate whether the alert is new for the customer. The alerts 522 may optionally be ordered according to risk score.

The end-user can select a particular alert, such as the top alert in the alerts 522, and view detailed information 524 regarding the alert. For example, a first portion of the user interface 520 may include the alerts 522 while a second portion of the user interface 520 may include the detailed information 524.

The detailed information 524 includes identifying information 526 for a selected alert (e.g., 'John Doe'). Example detailed information further includes alert information 528, such a status, when the alert was created, a total score, a hit count, and a risk score. In some embodiments, the total score may indicate an extent to which occurrences of scenario definitions were determined for the associated customer. In some embodiments, a hit count may indicate a specific number of scenario definitions.

The detailed information 524 further includes risk model scoring information 530, such as the risk level. Additionally, top risk scores 532 are illustrated. The top risk scores 532 may indicate specific sub-scores related to the risk score. For example, 'unusual text pattern score' is illustrated as having a sub-risk score of 86%. As another example, 'domicile risk' is illustrated. The domicile risk may optionally reflect a risk based on a location of the customer. This sub-risk score may be deterministically determined, such as a particular value based on the location. However, as described above other sub-risk scores may be probabilistically determined using a machine learning model.

Portion 532 indicates specific 'scenario hits', such as specific occurrences of scenario definitions. In this way, the end-user can quickly identify which scenario definitions were determined to have occurred for this customer.

The end-user can then review detailed information regarding this customer to perform an investigation. For example, the end-user can review detailed transactions associated with the customer.

Figure 6A:
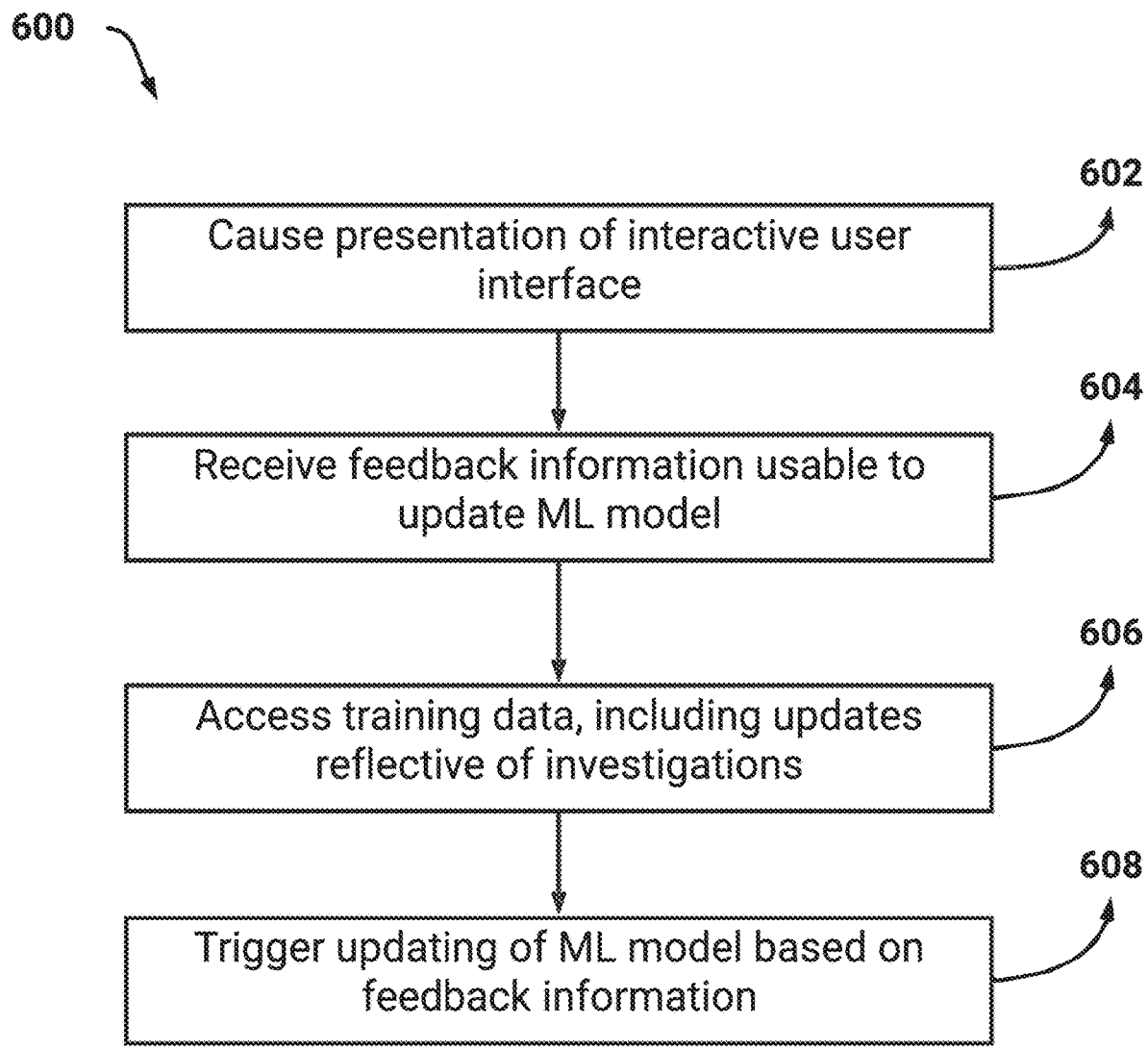
FIG. 6A illustrates a flowchart of an example process for triggering the updating of a machine learning model based on feedback information.

FIG. 6A illustrates a flowchart of an example process for triggering the updating of a machine learning model based on feedback information. For convenience, the process 600 will be described as being performed by a system of one or more computers (e.g., the alert monitoring system 100). Reference will be made herein to FIGS. 6B-6E.

At block 602, the system causes presentation of an interactive user interface. The interactive user interface may include the user interface 520 described above with respect to FIG. 5B.a At block 604, the system receives feedback information usable to update a machine learning model (e.g., the risk model described herein). As described above, an end-user of the user interface may provide feedback which allows for enhancing the risk model. For example, the end-user may identify an occurrence of a scenario definition which helped the end-user perform an investigation. As another example, the end-user may identify an occurrence of a scenario definition which was not useful, or hindered, the investigation. The end-user may also indicate whether the risk score, or one or more sub-risk scores, were helpful in the investigation. For example, the end-user can indicate whether an indication of a high risk level corresponded to a true positive.

Example user interfaces to provide feedback information will now be described with respect to FIGS. 6B-6E.

Figure 6B:
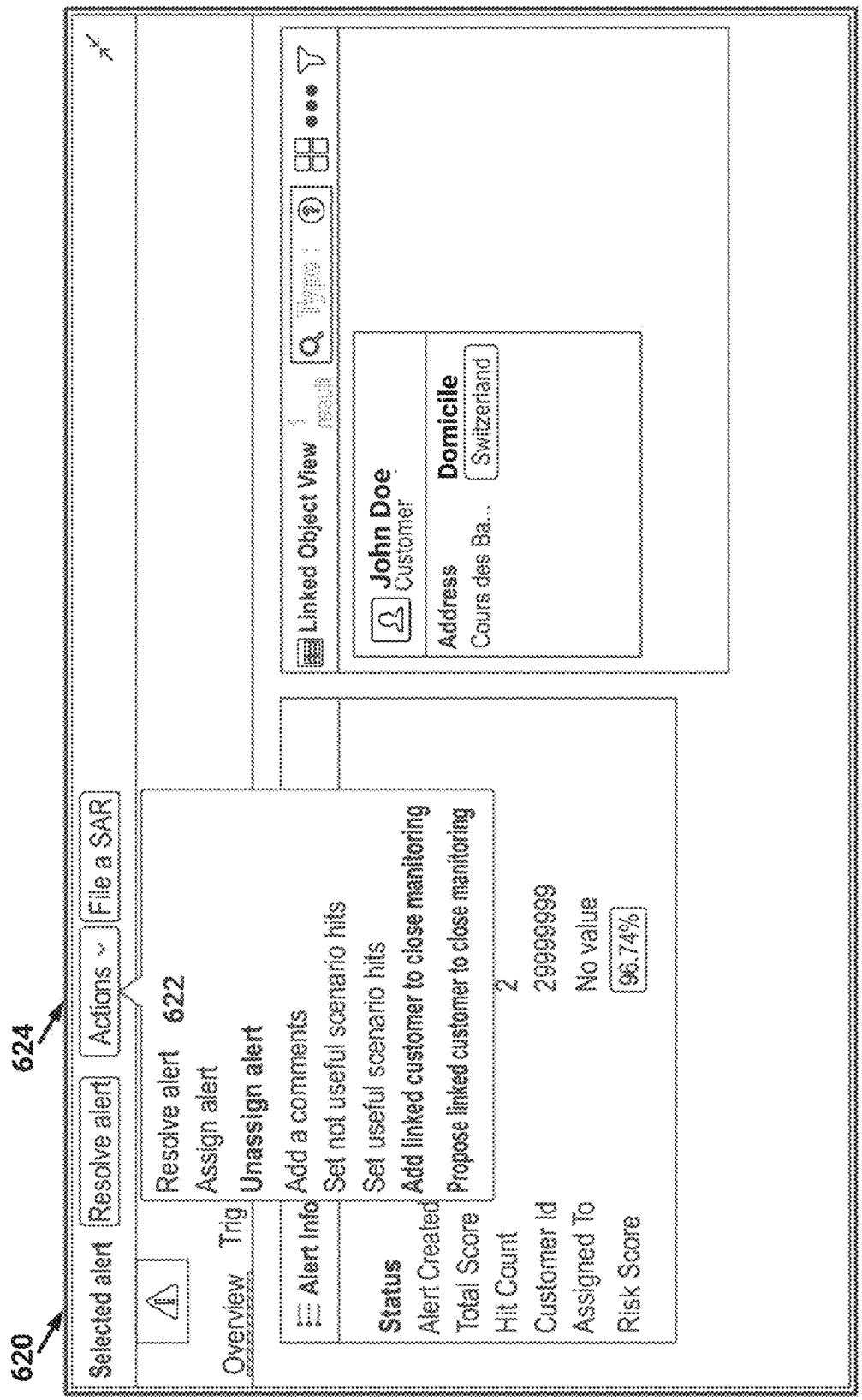
FIG. 6B is an example user interface including options associated with feedback information.

FIG. 6B is an example user interface 620 including options 622 associated with feedback information. The user interface 620 may be accessed via interaction with user interface element 624, which is included in the user interface 520 of FIG. 5B.

Figure 6D:
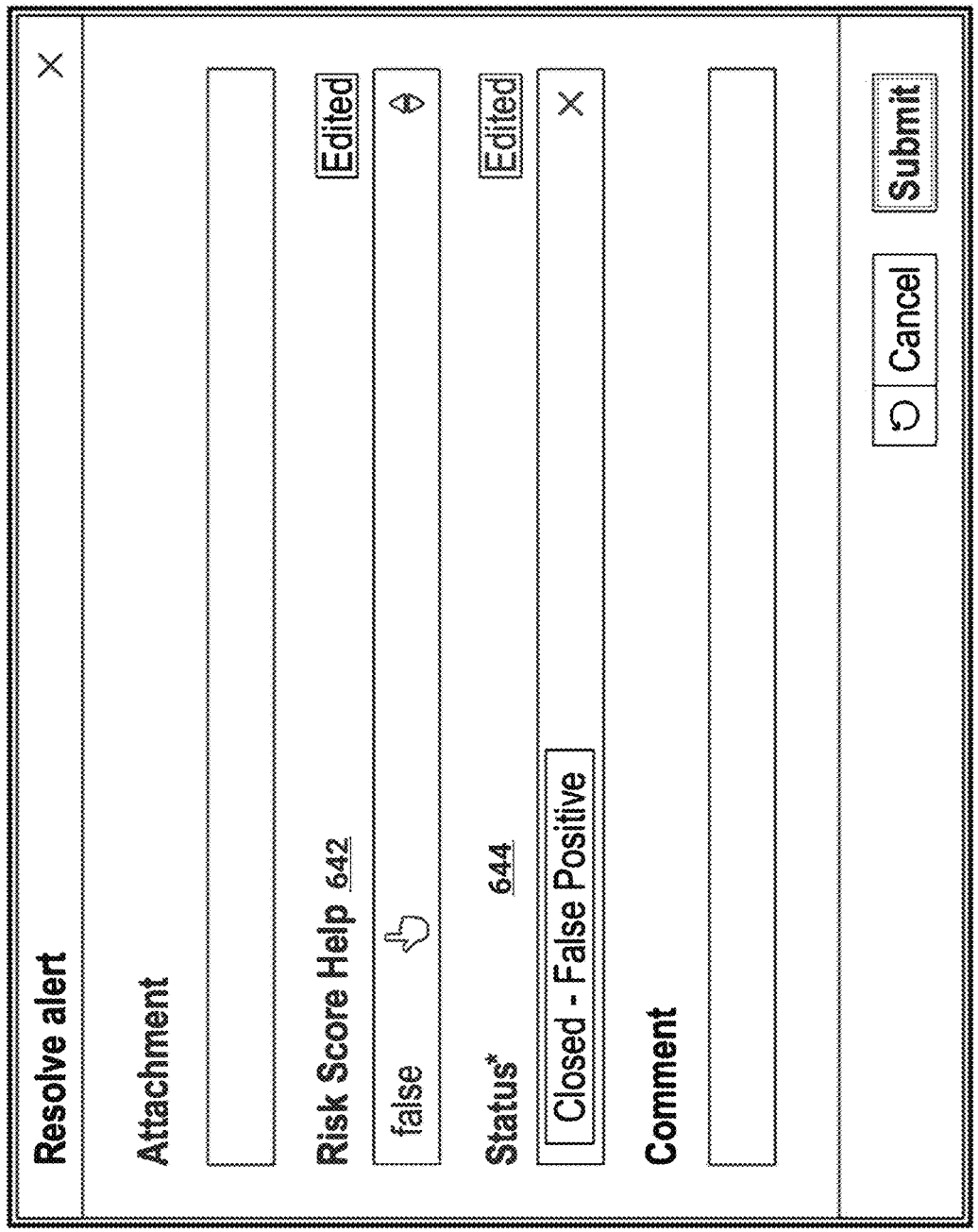
FIG. 6D is an example user interface usable to resolve an alert and provide feedback information associated with machine learning model.

The options 622 include various actions associated with an investigation into a customer (e.g., 'John Doe'). For example, the end-user of the user interface 620 may resolve the alert such by indicating whether it is a true positive or false positive. An example of resolving the alert is illustrated in FIG. 6D. The end-user may also assign the alert for review to another end-user. The end-user may also add comments for review by other end-users.

As illustrated, the options 622 indicate that the end-user may 'set not useful scenario hits' and 'set useful scenario hits.' These options may indicate feedback information regarding specific scenario definitions.

FIG. 6C is an example user interface 630 usable to provide feedback information reflecting the relevance of a scenario definition. The end-user may use user interface 630 to specify a particular scenario definition. For example, in the illustrated example the end-user has indicated that scenario hit 632 S01 is to be used as feedback information. Portion 634 of user interface 630 may be used to indicate whether the scenario definition was relevant to the end-user's investigation.

FIG. 6D is an example user interface 640 usable to resolve an alert and provide feedback information associated with machine learning model. The end-user may indicate whether the risk score was helpful during an investigation. In the illustrated example, the end-user has indicated 'false' as to whether the risk score was helpful. This feedback information may be used, for example, to update the risk model. Additionally, the user interface 640 includes a status option 644. In the illustrated example, the end-user has indicated that the investigation is to be closed and identified it as a false positive. It may be appreciated that the false positive may be used as training data to update the risk model. Additionally, the false positive may be used as historical information when presenting graphical representations of comparisons between scenario definitions as described herein.

FIG. 6E is an example user interface 650 usable to provide feedback information reflecting usefulness of one or more scenario definitions. As described in FIG. 6C, the end-user may specify scenario definitions were not helpful or which were helpful. Similarly, in FIG. 6E the end-user has identified multiple scenario definitions 652 which were helpful to close the investigation.

Reference will now return to FIG. 6A. At block 606, the system accesses training data for use in updating of the machine learning model based on the feedback information. The training data may reflect training data sets usable to train the risk model and may also reflect updates from investigations. For example, as investigations are performed, end-users may analyze customers and indicate whether the customers performed, or were otherwise associated with, an event of interest. The updated data may be stored and periodically used to update the machine learning model. Additionally, the updated data may be used when updating the machine learning model based on feedback information.

At block 608, the system triggers updating of the machine learning model. The feedback information, as described at least in FIG. 1B, may be used to update the machine learning model. For example, the feedback information may reflect that a particular scenario definition was not useful, or was useful, in an investigation. Thus, this feedback information may be used to update a weighting associated with an occurrence of the scenario definition in the machine learning model. Additionally, the feedback information may reflect that a risk score was not helpful. For example, the risk score may have indicated a high measure of risk. In this example, an end-user may have indicated a false positive. Thus, the machine learning model may be updated based on this empirically determined error. In some embodiments, the feedback information may be weighted more highly during training. Thus, the determined error may be weighted more highly so as to force the machine learning model to more rapidly update weights of the model.

Figure 7A:
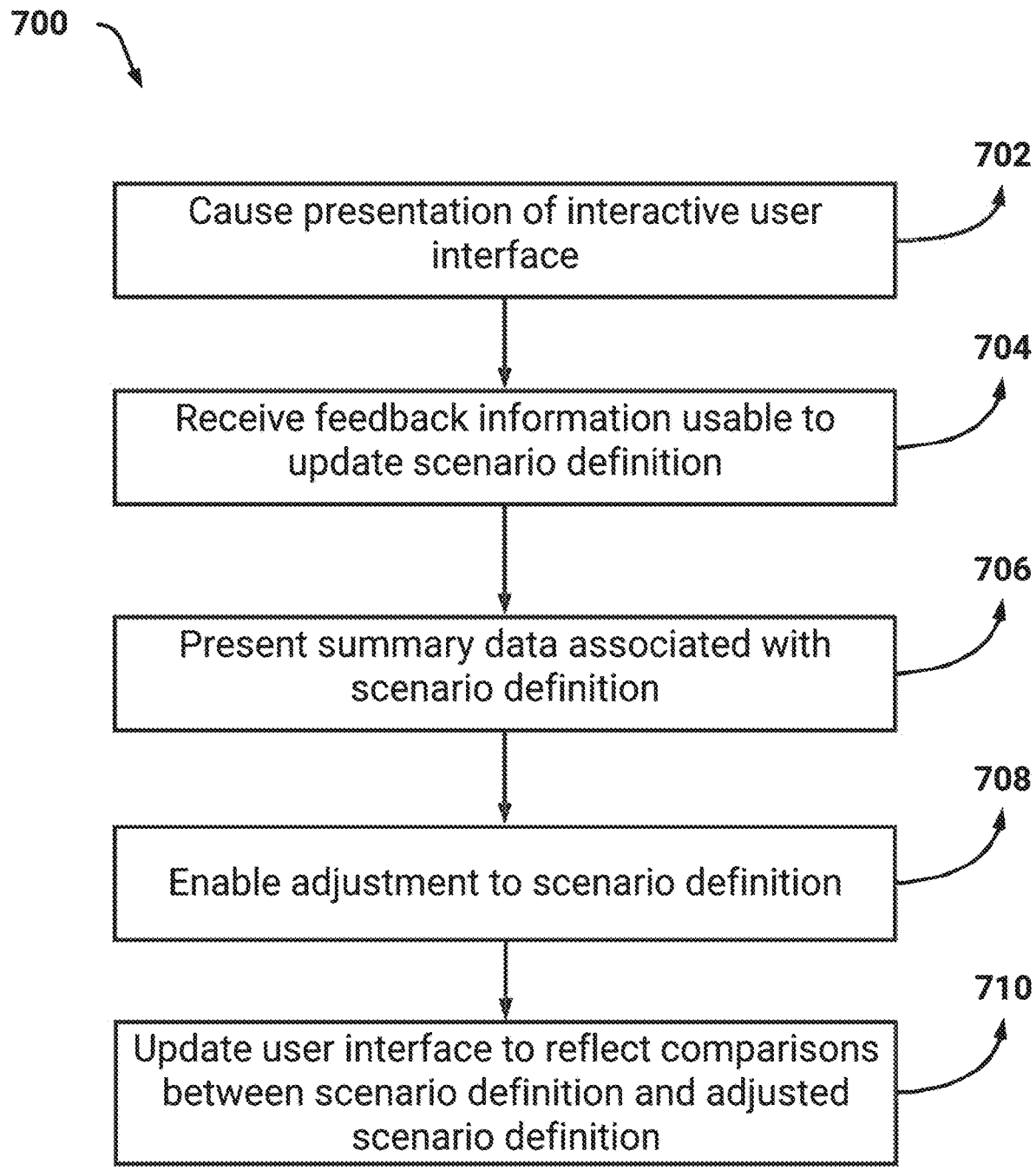
FIG. 7A illustrates a flowchart of an example process for responding to feedback information associated with a scenario definition.
Figure 7B:
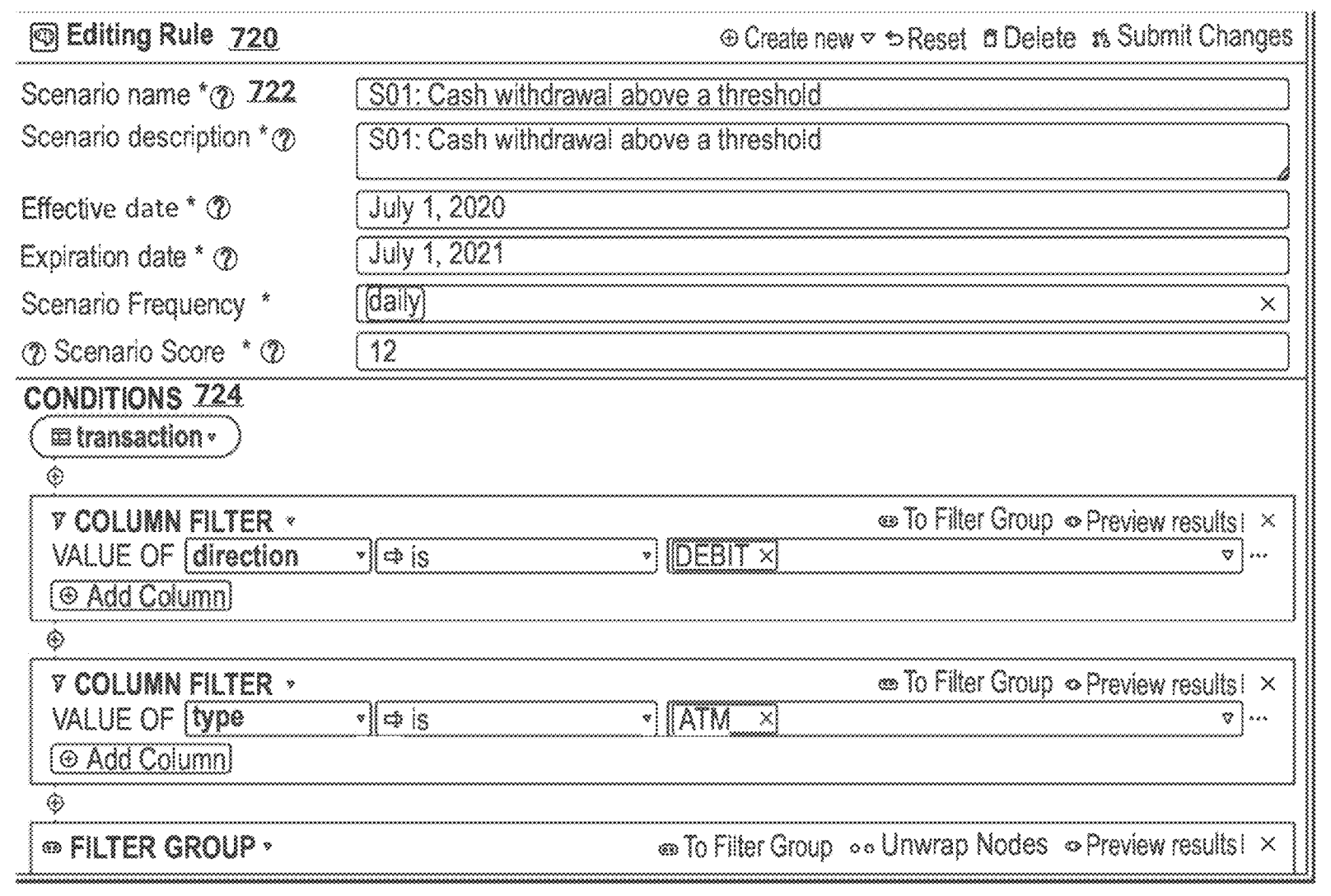
Figure 7C:
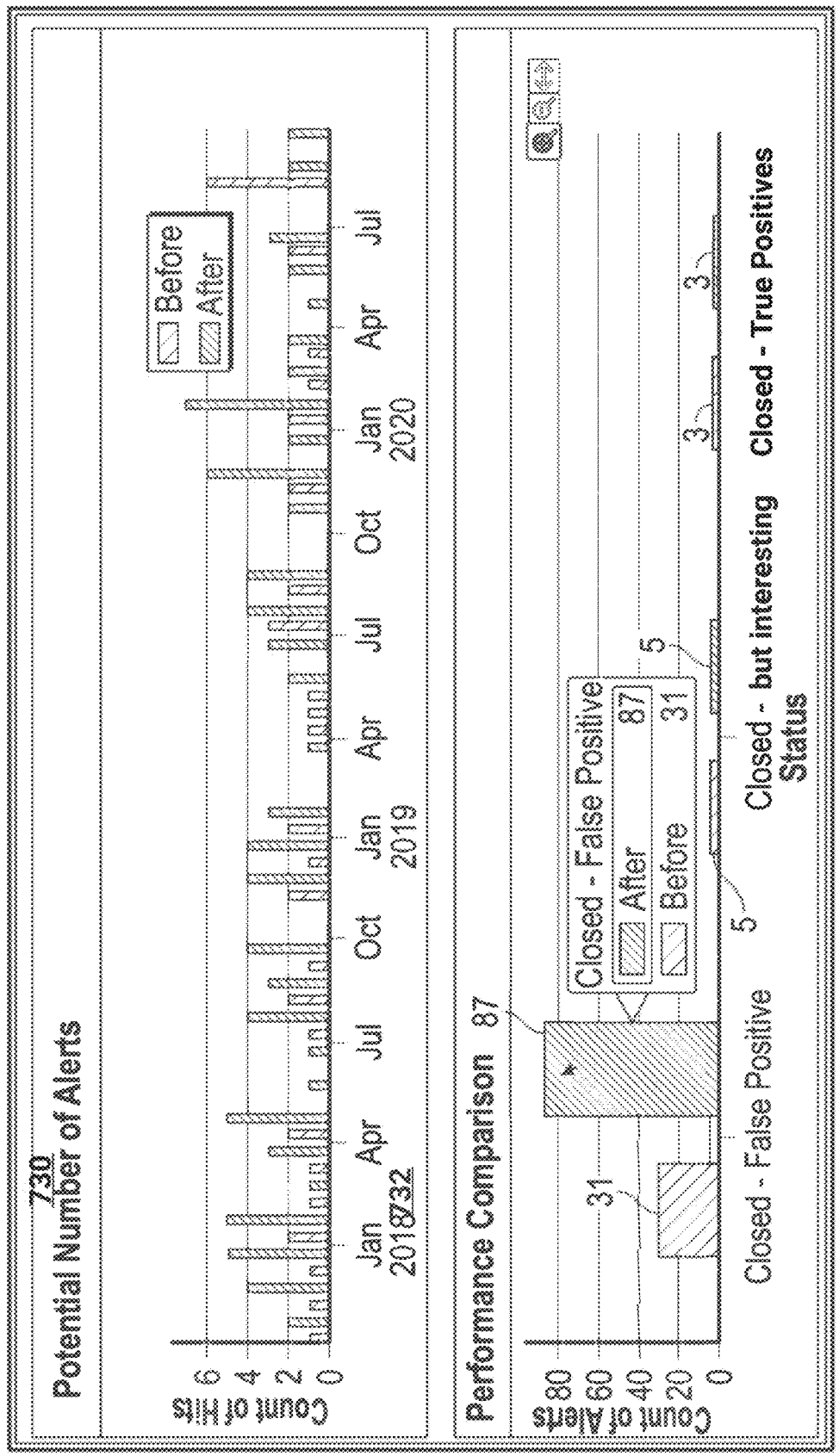
FIG. 7C is an example user interface for graphically comparing versions of a scenario definition.

FIG. 7A illustrates a flowchart of an example process 700 for responding to feedback information associated with a scenario definition. For convenience, the process 700 will be described as being performed by a system of one or more computers (e.g., the alert monitoring system 100).

At block 702, the system causes presentation of an interactive user interface. At block 704, the system receives feedback information usable to update a scenario definition. FIGS. 6A-6E describe examples of updating a machine learning model based on feedback information. In some embodiments, the feedback information may be used to update a scenario definition itself.

For example, in FIG. 6C an end-user is illustrated as having noted that a scenario definition was not relevant. In some embodiments, the system may store information so that this scenario definition may be updated in the future. For example, an end-user may access a user interface which identifies a threshold number of scenario definitions. In this example, these scenario definitions may have been flagged greater than a threshold number of times as being not relevant.

At block 706, the system presents summary data associated with a scenario definition. The system may respond to selection of particular scenario definition which is to be updated. For example, this scenario definition may have been indicated in feedback information as not being helpful. The summary data may include a user interface for creating or adjusting the scenario definition.

At block 708, the system enables adjustment to the scenario definition. For example, the end-user may adjust the scenario definition to provide better performance. FIG. 7B illustrates a user interface to adjust a scenario definition. At block 710, the system updates the user interface to reflect comparisons between versions of the scenario definition. FIG. 7C illustrates an example user interface reflecting comparisons.

FIG. 7B is an example user interface 720 for adjusting a scenario definition. In the user interface 720, a name 722 of the scenario definition is included. Below the name 722, additional summary information is reflected. For example, the summary information includes a description of the scenario, a frequency with which the scenario is applied to raw datasets, a score associated with the scenario and so on. The score may be used to determine the 'Total Score' illustrated in portion 528 of user interface 520. Additionally, the user interface 720 includes options 724 to update the scenario definition. For example, an end-user can update a logical expression which may leverage filters, Boolean expressions, objects, and so on.

FIG. 7C is an example user interface 730 for graphically comparing versions of a scenario definition. In FIG. 7B, the end-user can update a scenario definition. Upon updating the definition, such as via updating a threshold or other information in an expression, comparison information may be presented.

In user interface 730, a number of alerts 732 may be graphically depicted between two versions of a scenario definition. For example, a first version may represent the definition before an adjustment and a second version may represent the definition after the adjustment. This user interface 730 includes a chart which identifies a 'count of hits' (e.g., occurrences) for the versions over time. These hits may be based on raw datasets as described herein. Thus, the dates may relate to the portions of the raw datasets which are associated with the dates.

A performance comparison 734 is also included in user interface 730. This may reflect a summary of a number of false positives, investigations which were closed but the end-user found them interesting/persuasive, and a number of true positives. As described above, this information may be based on historical information. Thus, the end-user of the user interface 730 may identifier which version provides better performance.

Notification Module

In some embodiments, the alerts and/or notifications (e.g., as described above) are automatically transmitted to a user device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated, and the URL included in the alert and/or notification is accessed via the Internet.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
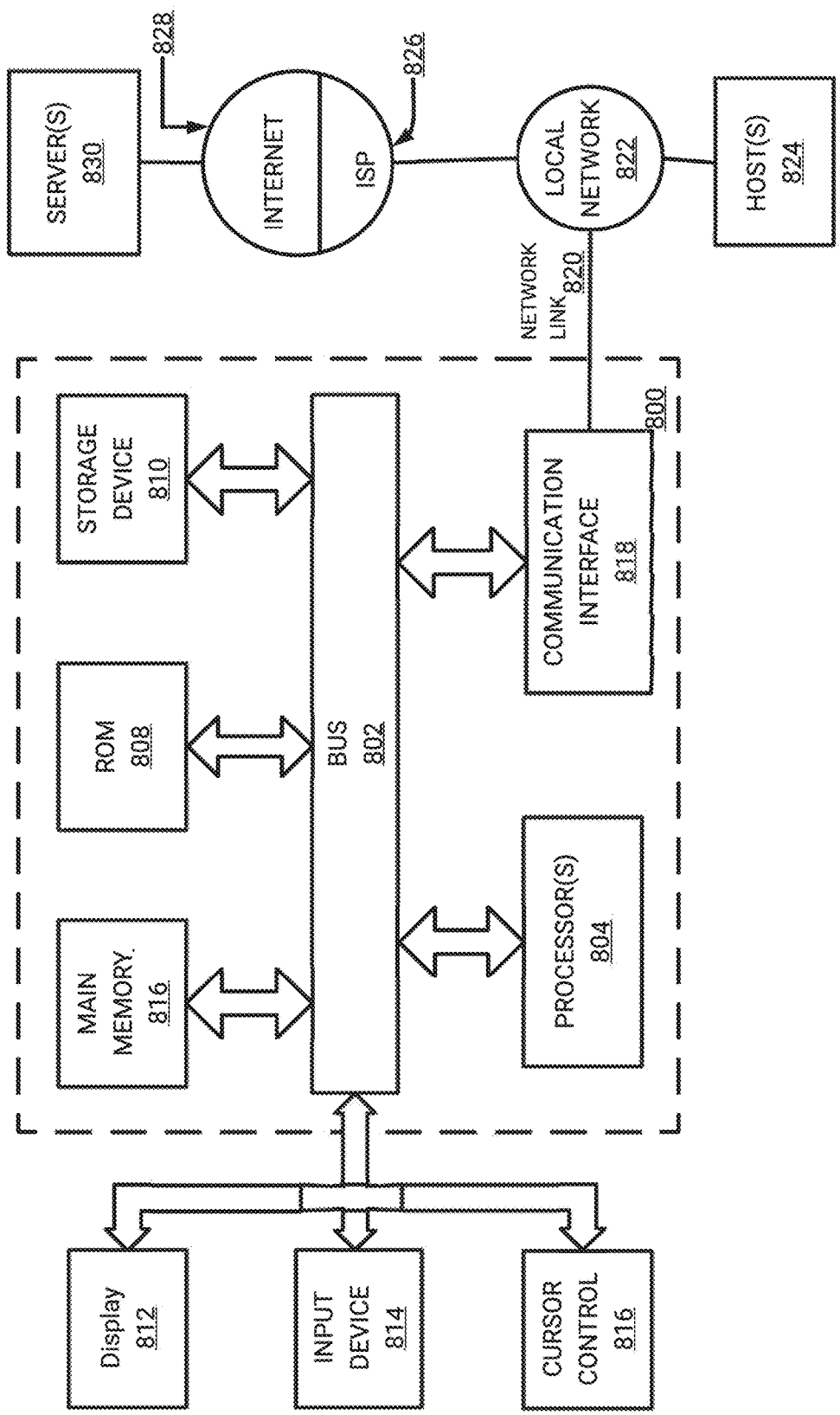
FIG. 8 illustrates a computer system with which certain methods discussed herein may be implemented.

For example, FIG. 8 is a block diagram that illustrates a computer system 800 upon which various embodiments may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
by a system of one or more computers,
accessing a plurality of datasets storing customer information comprising, at least, a plurality of transactions associated with a plurality of customers, each transaction indicating a plurality of features;
generating individual risk scores for the plurality of customers based on the customer information, wherein generating the risk scores comprises:
identifying occurrences of scenario definitions, wherein each scenario definition specifies one or more object types of a plurality of object types and expressions utilizing the object types and one or more of the features,
wherein a data pipeline is applied to the datasets, wherein the data pipeline causes extraction of object types in accordance with an ontology,
wherein an occurrence of a scenario definition indicates satisfaction of the specified expression with respect to customer information, and
providing the identified occurrences and customer information as input to one or more machine learning models, wherein the machine learning models assign respective risk scores to the customers; and
causing presentation, via a user device, of an interactive user interface, wherein the interactive user interface:
presents summary information associated with the risk scores, wherein the interactive user interfaces enables an investigation into whether a particular customer is exhibiting risky behavior, and responds to user input indicating feedback usable to update the one or more machine learning models or scenario definitions,
wherein the feedback triggers updating of the machine learning models.

2. The method of claim 1, wherein identifying an occurrence of a scenario definition comprises:
accessing raw data associated with a customer, wherein the raw data is transformed via the ontology; and
analyzing, via an expression of the scenario definition, the transformed raw data.

3. The method of claim 1, wherein the customers are grouped into sub-groups associated with respective cohorts, and wherein the scenario definitions and machine learning models are specific to a cohort.

4. The method of claim 1, wherein interactive user interface is configured to receive information indicating closing of an investigation into the particular customer, and wherein the closing of the investigation is stored as training data for periodic updating of the machine learning models.

5. The method of claim 1, wherein the feedback indicates that a particular scenario definition was not helpful to the investigation into the particular customer, and wherein the interactive user interface presents:
enables adjustment of the particular scenario definition;
summary information reflecting comparisons in occurrences of the adjusted particular scenario definition and unadjusted particular scenario definition, the occurrences being determined by the system based on historical information associated with investigations into customers, wherein the summary information indicates outcomes associated with investigations into customers associated with the occurrences.

6. The method of claim 1, wherein the feedback indicates that a particular scenario definition was not helpful to the investigation into the particular customer, and wherein the machine learning models are trained to adjust a weight associated with an occurrence of the particular scenario definition.

7. The method of claim 1, wherein the feedback indicates that a risk score assigned to the particular customer was indicative of risky behavior, wherein an outcome of the investigation into the particular customer indicated false positive, and wherein the machine learning models are updated based on the outcome.

8. The method of claim 1, wherein the interactive user interface:
enables generation of a plurality of versions of the machine learning models, wherein each machine learning model is trained based on historical information associated with investigations into customers; and
presents summary information reflecting respective accuracies associated with the versions, wherein the interactive user interface is configured to deploy one of the versions into production usage.

9. A system comprising one or more processors and non-transitory computer storage media storing instructions that when executed by the one or more processors, cause the processors to perform operations comprising:
accessing a plurality of datasets storing customer information comprising, at least, a plurality of transactions associated with a plurality of customers, each transaction indicating a plurality of features;
generating individual risk scores for the plurality of customers based on one or more machine learning models, wherein customer information and occurrences of scenario definitions are provided as input to the machine learning models, wherein each scenario definition specifies one or more object types of a plurality of object types and expressions utilizing the object types and one or more of the features, wherein a data pipeline is applied to the datasets, wherein the data pipeline causes extraction of object types in accordance with an ontology, and wherein the scenario definitions are used to identify occurrences of specific information reflected in the datasets; and
causing presentation, via a user device, of an interactive user interface, wherein the interactive user interface:
presents summary information associated with the risk scores, wherein the interactive user interfaces enables an investigation into whether a particular customer is exhibiting risky behavior, and
responds to user input indicating feedback usable to update the one or more machine learning models or scenario definitions,
wherein the feedback triggers updating of the machine learning models.

10. The system of claim 9, wherein identifying an occurrence of a scenario definition comprises:
accessing raw data associated with a customer, wherein the raw data is transformed via the ontology; and
analyzing, via an expression of the scenario definition, the transformed raw data.

11. The system of claim 9, wherein the feedback indicates that a particular scenario definition was not helpful to the investigation into the particular customer, and wherein the interactive user interface presents:
enables adjustment of the particular scenario definition;
summary information reflecting comparisons in occurrences of the adjusted particular scenario definition and unadjusted particular scenario definition, the occurrences being determined by the system based on historical information associated with investigations into customers, wherein the summary information indicates outcomes associated with investigations into customers associated with the occurrences.

12. The system of claim 9, wherein the feedback indicates that a particular scenario definition was not helpful to the investigation into the particular customer, and wherein the machine learning models are trained to adjust a weight associated with an occurrence of the particular scenario definition.

13. The system of claim 9, wherein the feedback indicates that a risk score assigned to the particular customer was indicative of risky behavior, wherein an outcome of the investigation into the particular customer indicated false positive, and wherein the machine learning models are updated based on the outcome.

14. The system of claim 9, wherein the interactive user interface:
enables generation of a plurality of versions of the machine learning models, wherein each machine learning model is trained based on historical information associated with investigations into customers; and
presents summary information reflecting respective accuracies associated with the versions, wherein the interactive user interface is configured to deploy one of the versions into production usage.

15. Non-transitory computer storage media storing instructions that when executed by a system of one or more computers, cause the one or more computers to perform operations comprising:
accessing a plurality of datasets storing customer information comprising, at least, a plurality of transactions associated with a plurality of customers, each transaction indicating a plurality of features;

generating individual risk scores for the plurality of customers based on one or more machine learning models, wherein customer information and occurrences of scenario definitions are provided as input to the machine learning models, wherein each scenario definition specifies one or more object types of a plurality of object types and expressions utilizing the object types and one or more of the features, wherein a data pipeline is applied to the datasets, wherein the data pipeline causes extraction of object types in accordance with an ontology, and wherein the scenario definitions are used identify occurrences of specific information reflected in the datasets; and causing presentation, via a user device, of an interactive user interface, wherein the interactive user interface:

presents summary information associated with the risk scores, wherein the interactive user interfaces enables an investigation into whether a particular customer is exhibiting risky behavior, and responds to user input indicating feedback usable to update the one or more machine learning models or scenario definitions, wherein the feedback triggers updating of the machine learning models.

16. The computer storage media of claim 15, wherein identifying an occurrence of a scenario definition comprises:

accessing raw data associated with a customer, wherein the raw data is transformed via the ontology; and analyzing, via an expression of the scenario definition, the transformed raw data.

17. The computer storage media of claim 15, wherein the feedback indicates that a particular scenario definition was not helpful to the investigation into the particular customer, and wherein the interactive user interface presents:

enables adjustment of the particular scenario definition;

summary information reflecting comparisons in occurrences of the adjusted particular scenario definition and unadjusted particular scenario definition, the occurrences being determined by the system based on historical information associated with investigations into customers, wherein the summary information indicates outcomes associated with investigations into customers associated with the occurrences.

18. The computer storage media of claim 15, wherein the feedback indicates that a particular scenario definition was not helpful to the investigation into the particular customer, and wherein the machine learning models are trained to adjust a weight associated with an occurrence of the particular scenario definition.

19. The computer storage media of claim 15, wherein the feedback indicates that a risk score assigned to the particular customer was indicative of risky behavior, wherein an outcome of the investigation into the particular customer indicated false positive, and wherein the machine learning models are updated based on the outcome.

20. The computer storage media of claim 15, wherein the interactive user interface:

enables generation of a plurality of versions of the machine learning models, wherein each machine learning model is trained based on historical information associated with investigations into customers; and presents summary information reflecting respective accuracies associated with the versions, wherein the interactive user interface is configured to deploy one of the versions into production usage.

* * * * *